H. M. MARSH.
BROOM MAKING MACHINE.
APPLICATION FILED MAY 1, 1909.
944,803.
Patented Dec. 28, 1909.
15 SHEETS—SHEET 4.
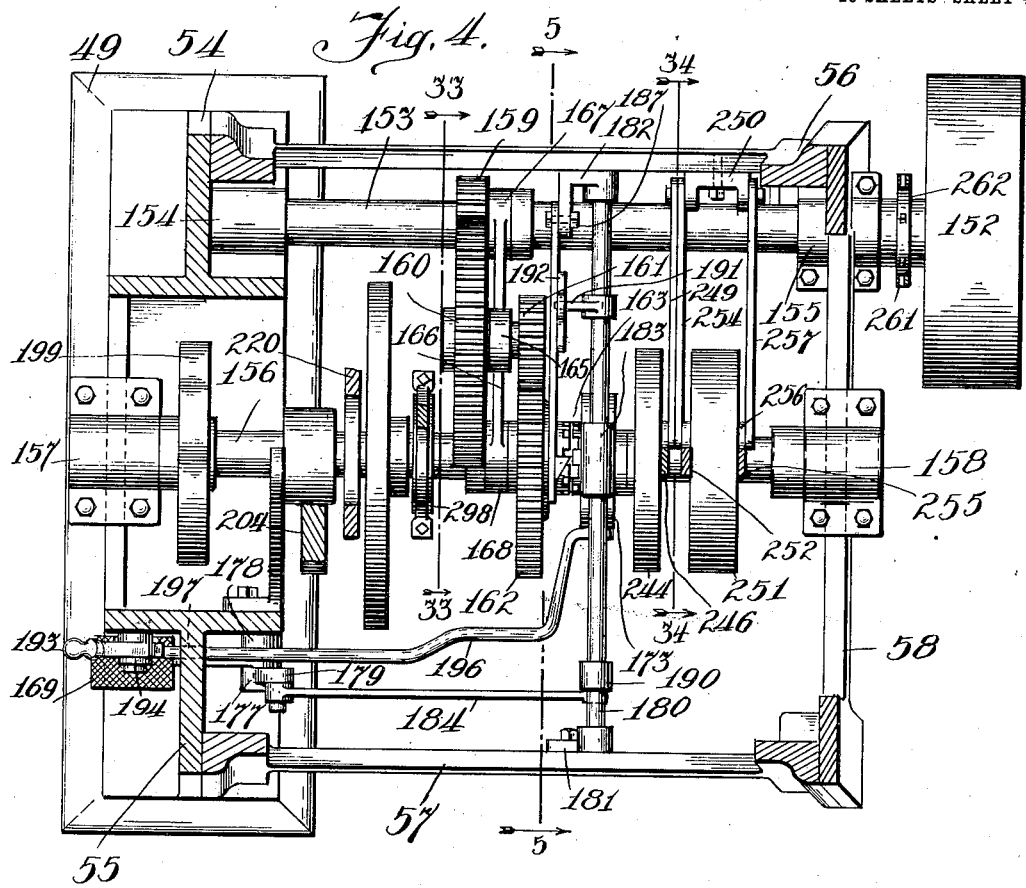
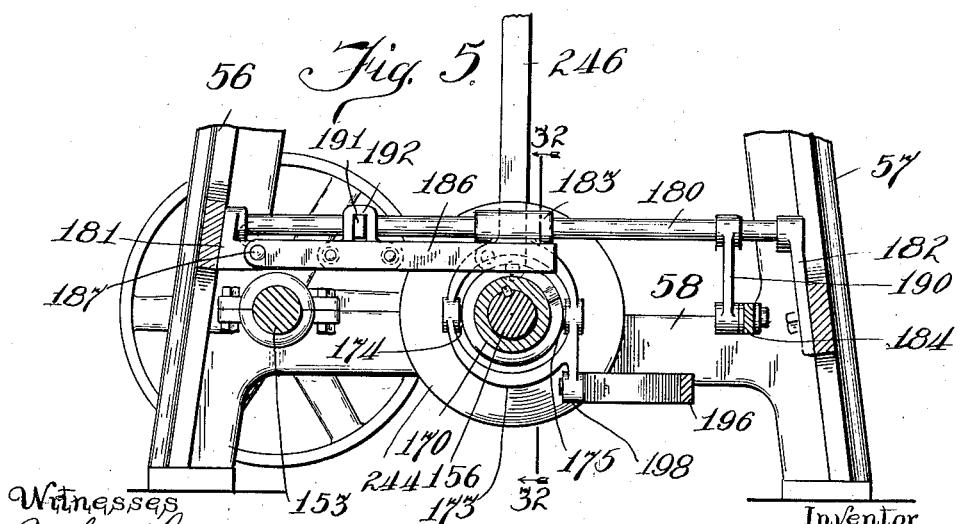
Witnesses
Inventor
Hugh M. Marsh
By Gillson & Gillson
Attorneys.

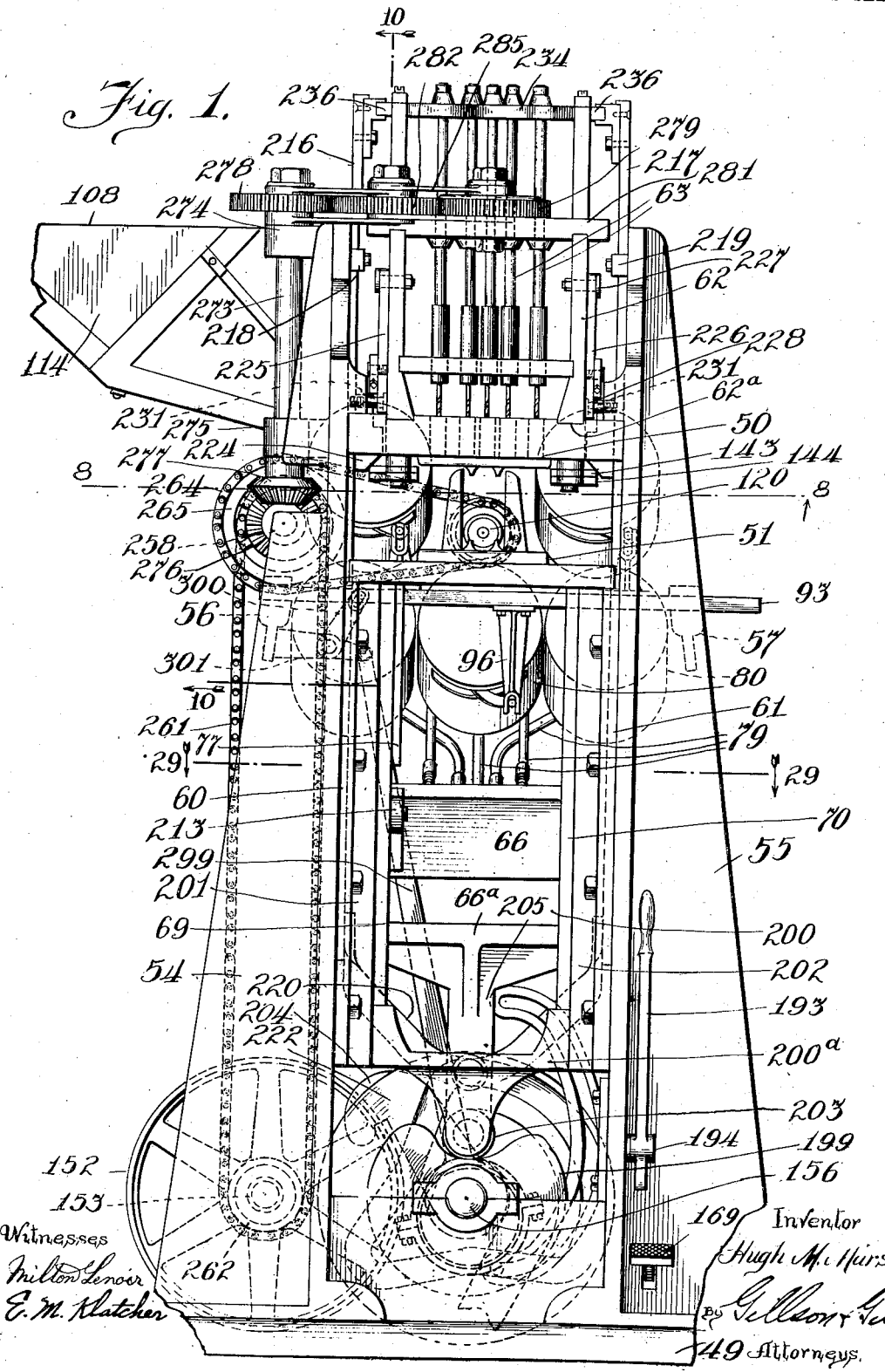

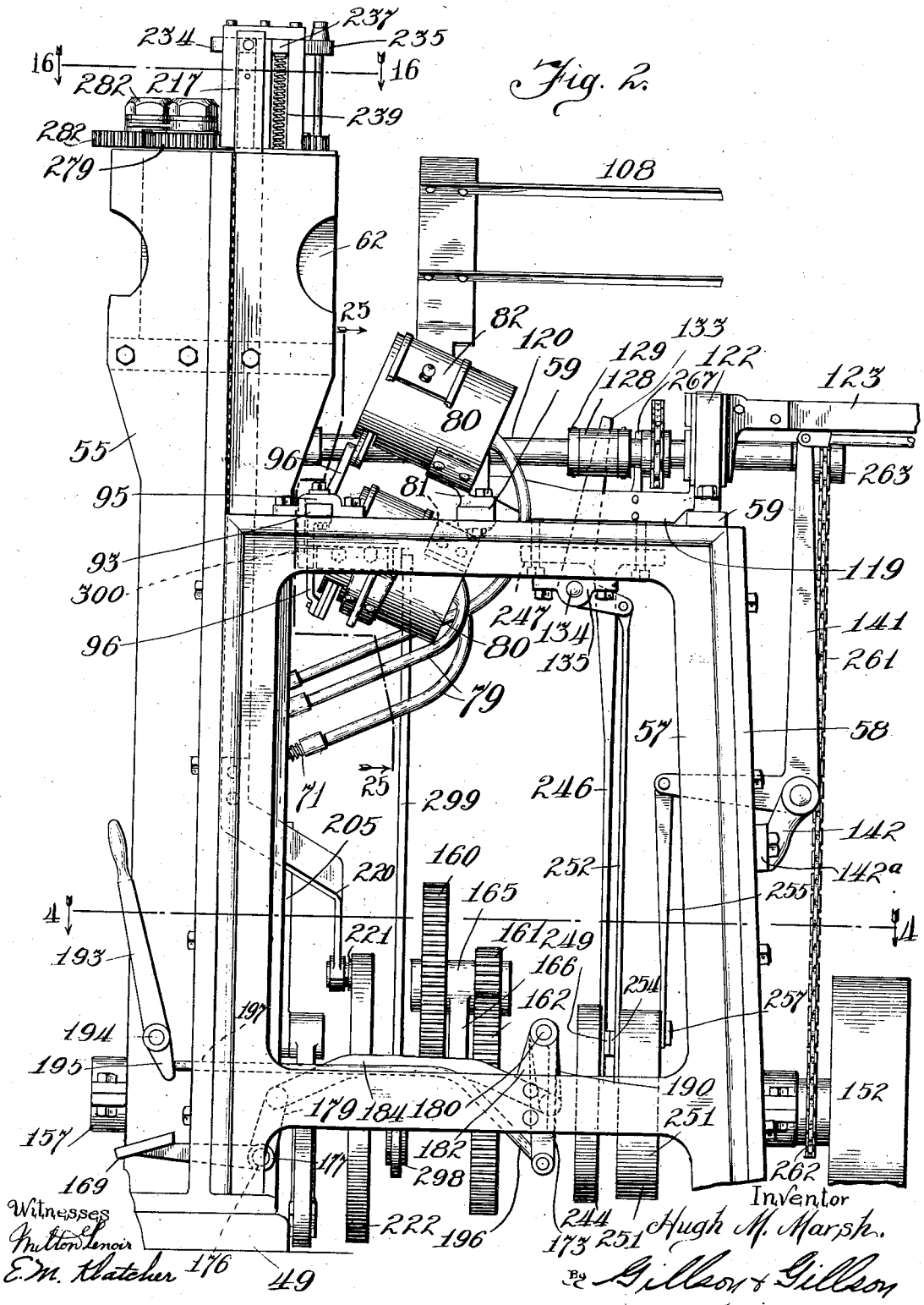

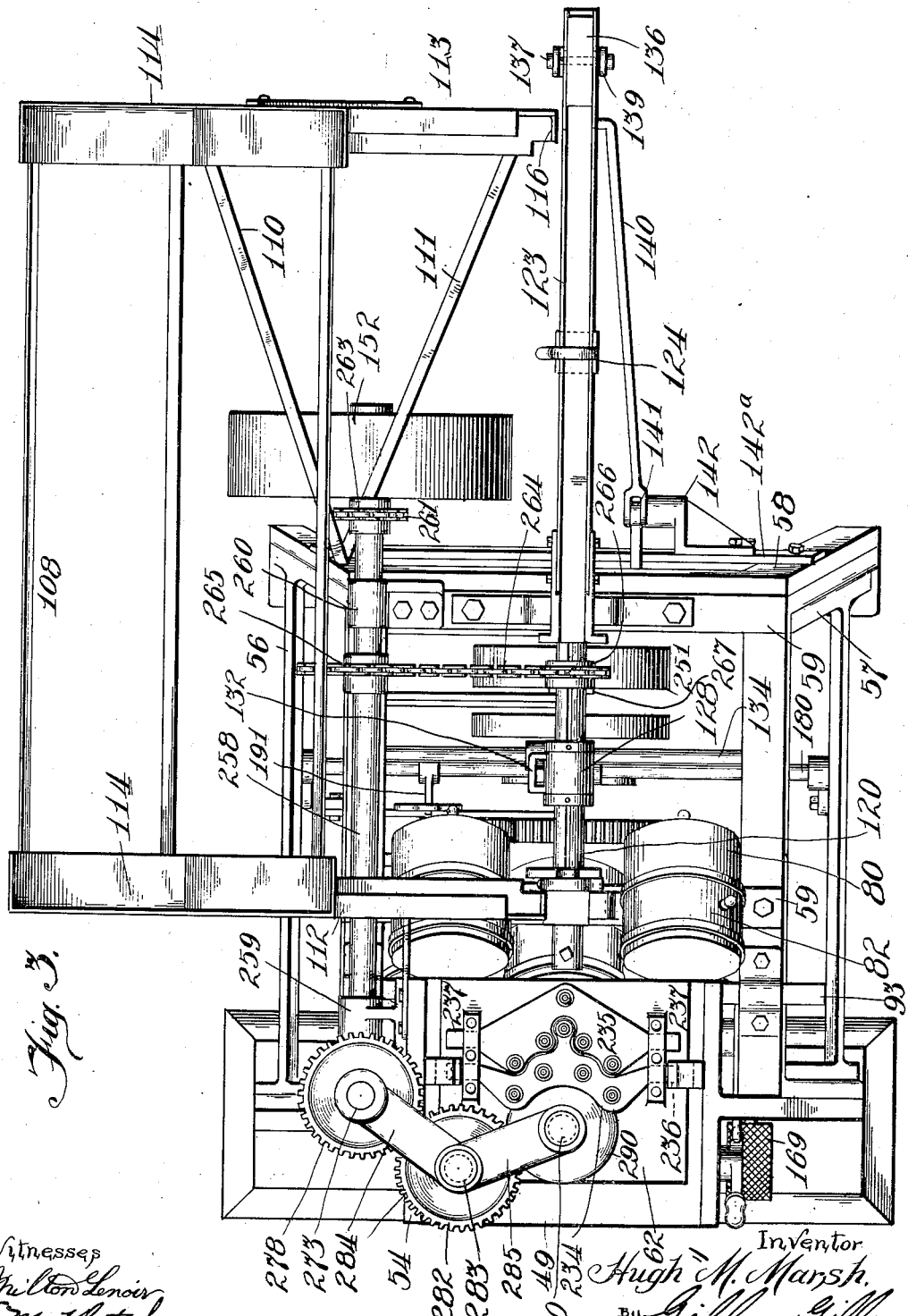

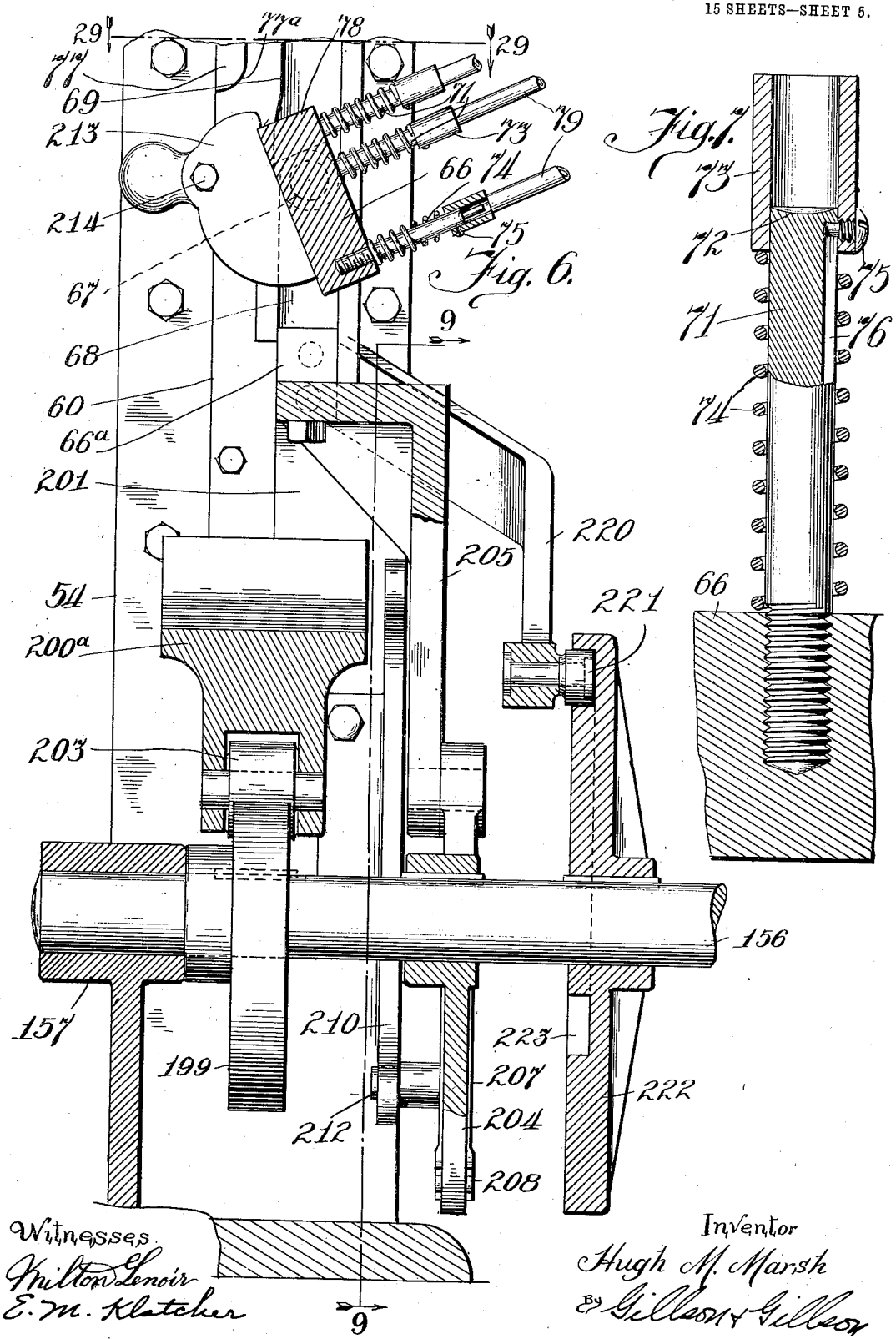

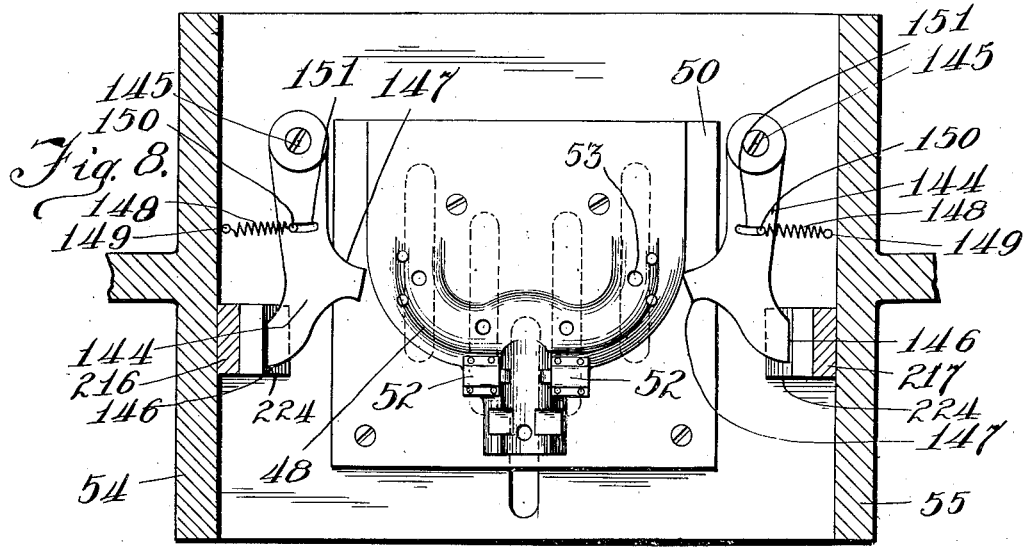
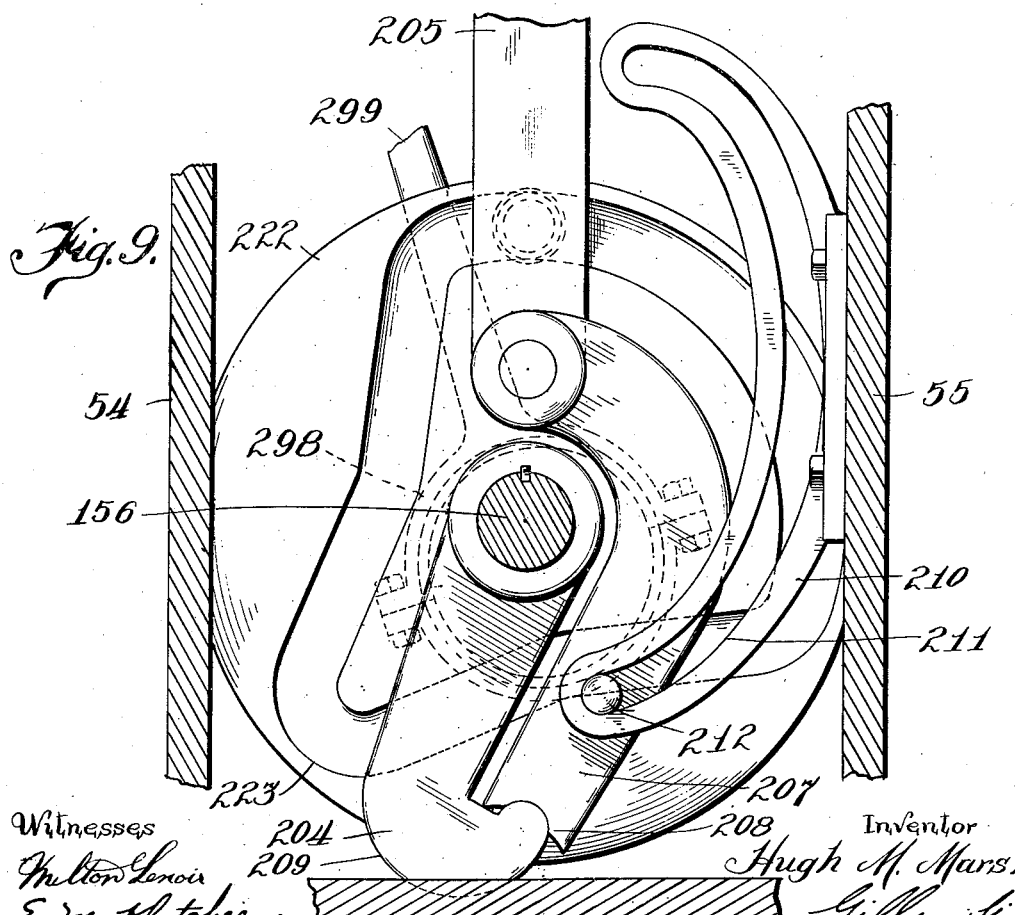

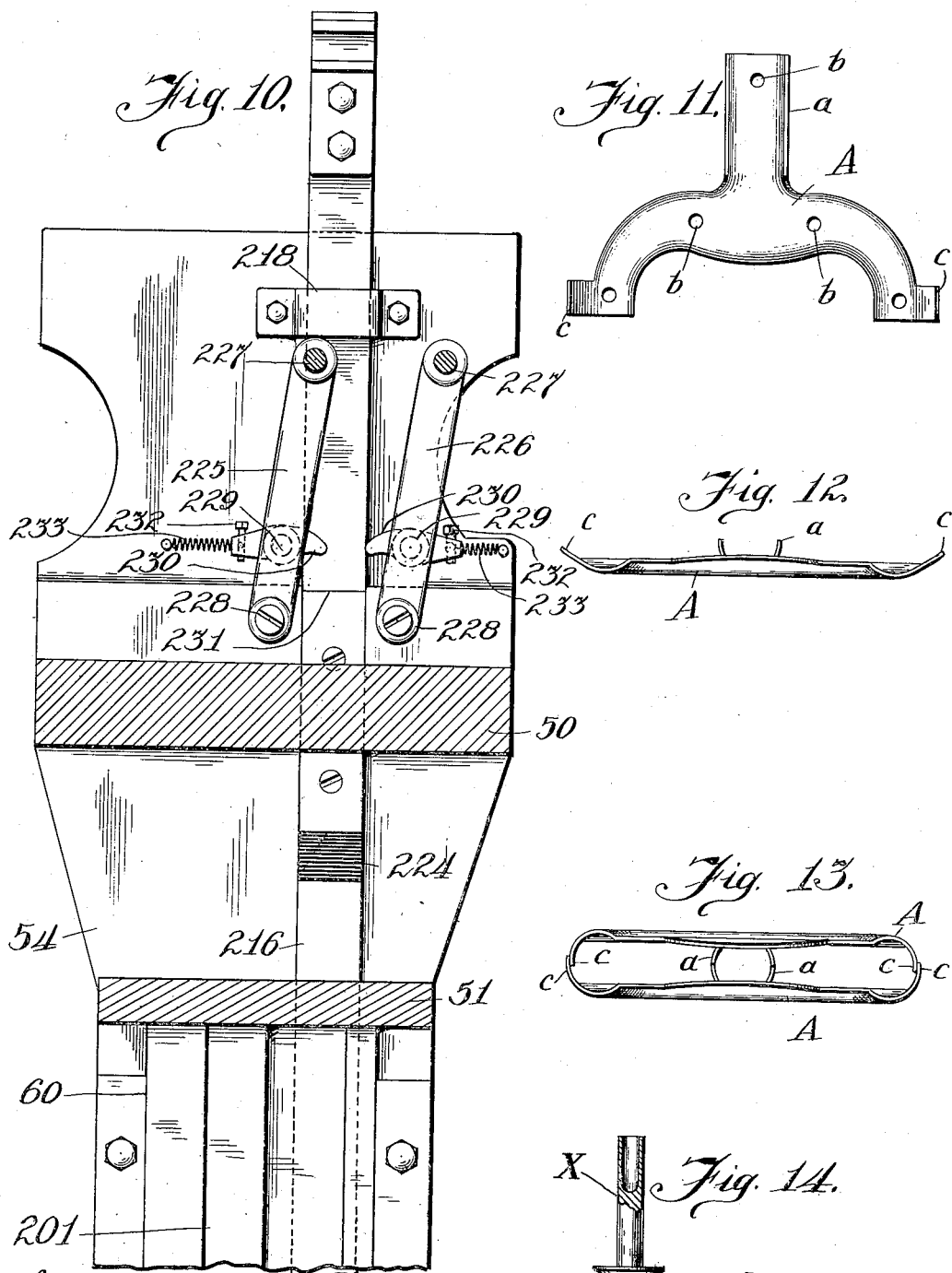

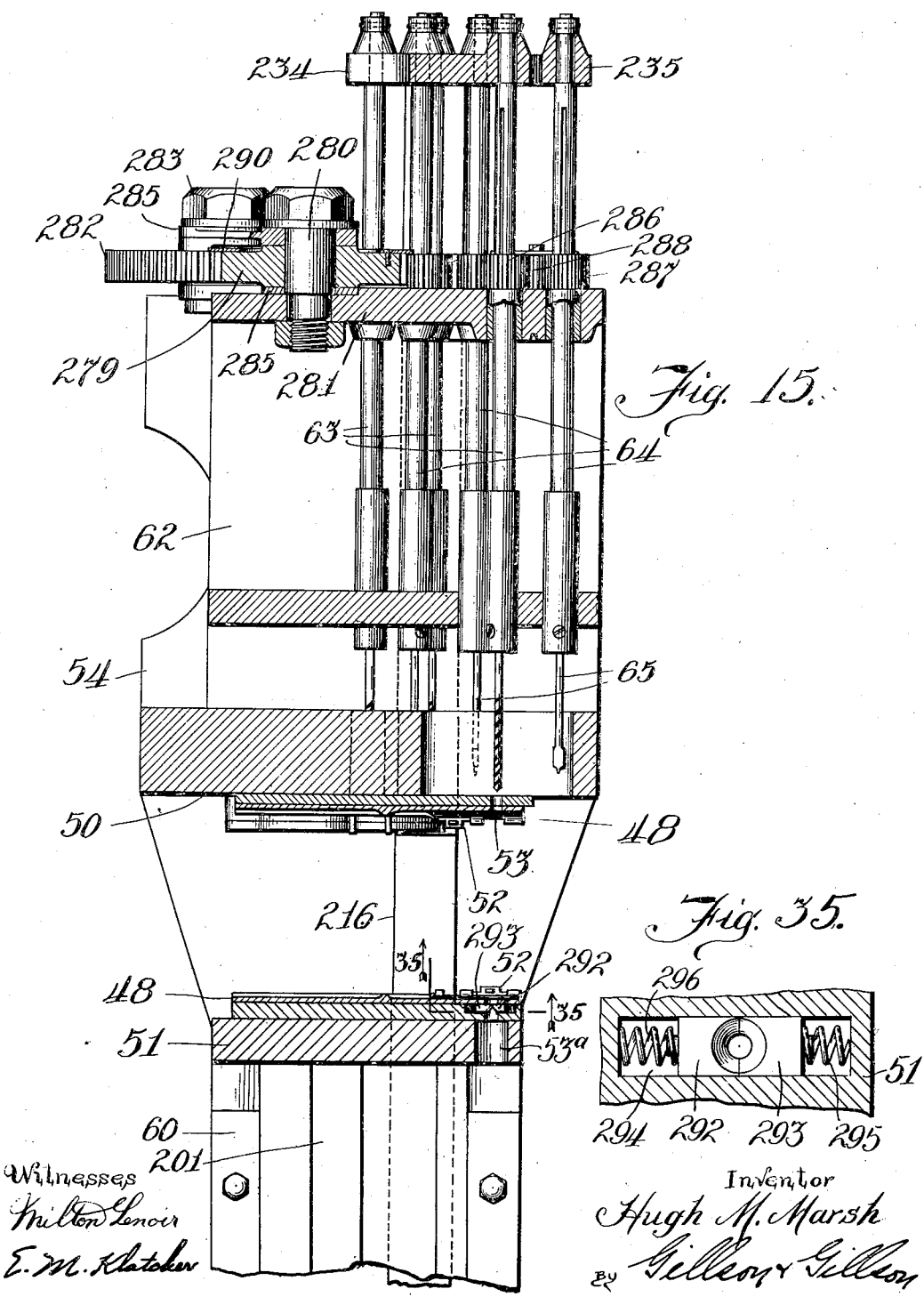

H. M. MARSH.
BROOM MAKING MACHINE.
APPLICATION FILED MAY 1, 1909.

944,803.

Patented Dec. 28, 1909.
15 SHEETS—SHEET 9.

Witnesses
Milton Lenoir
E. M. Klatcher

Inventor
Hugh M. Marsh.
By Gilleon & Gilleon
Attorneys.

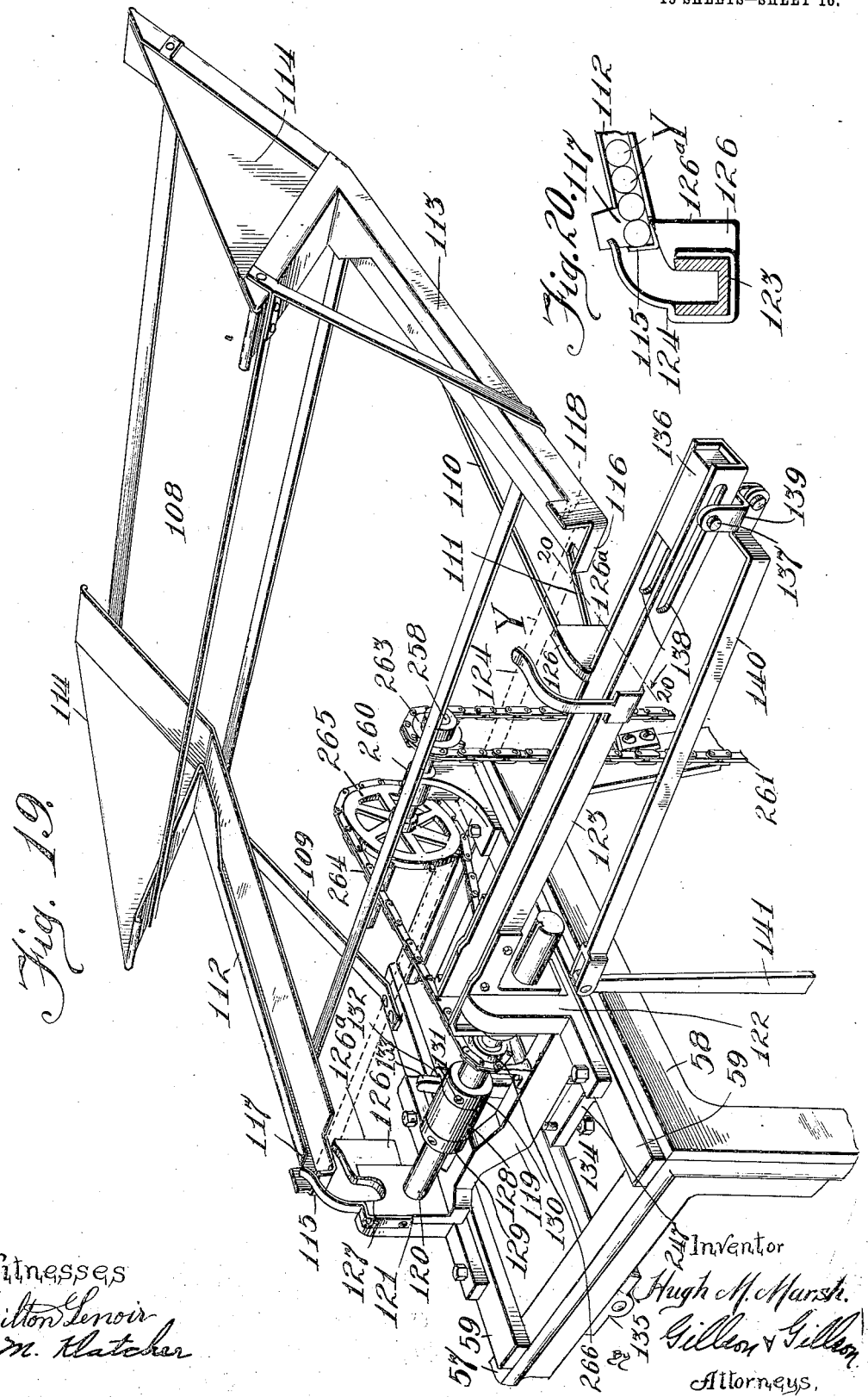

H. M. MARSH.
BROOM MAKING MACHINE.
APPLICATION FILED MAY 1, 1909.
944,803.
Patented Dec. 28, 1909.
15 SHEETS—SHEET 11.
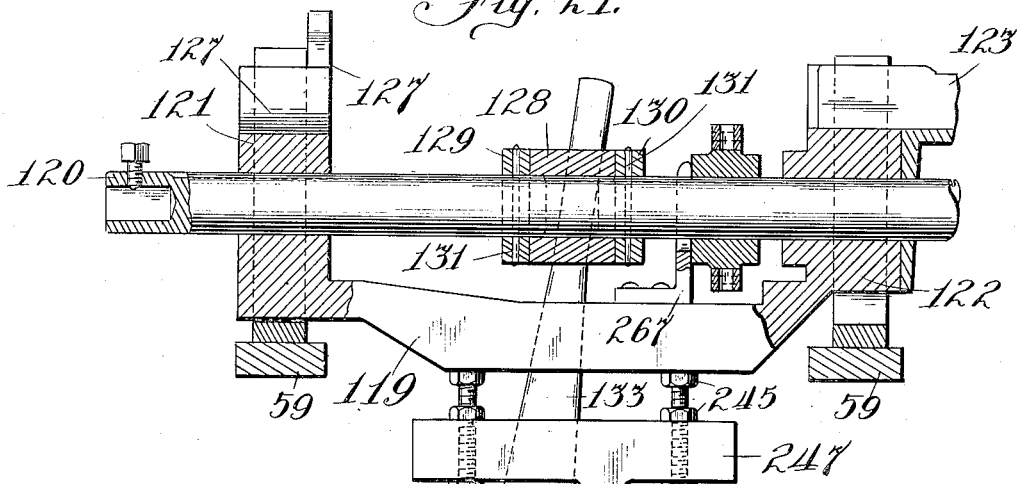
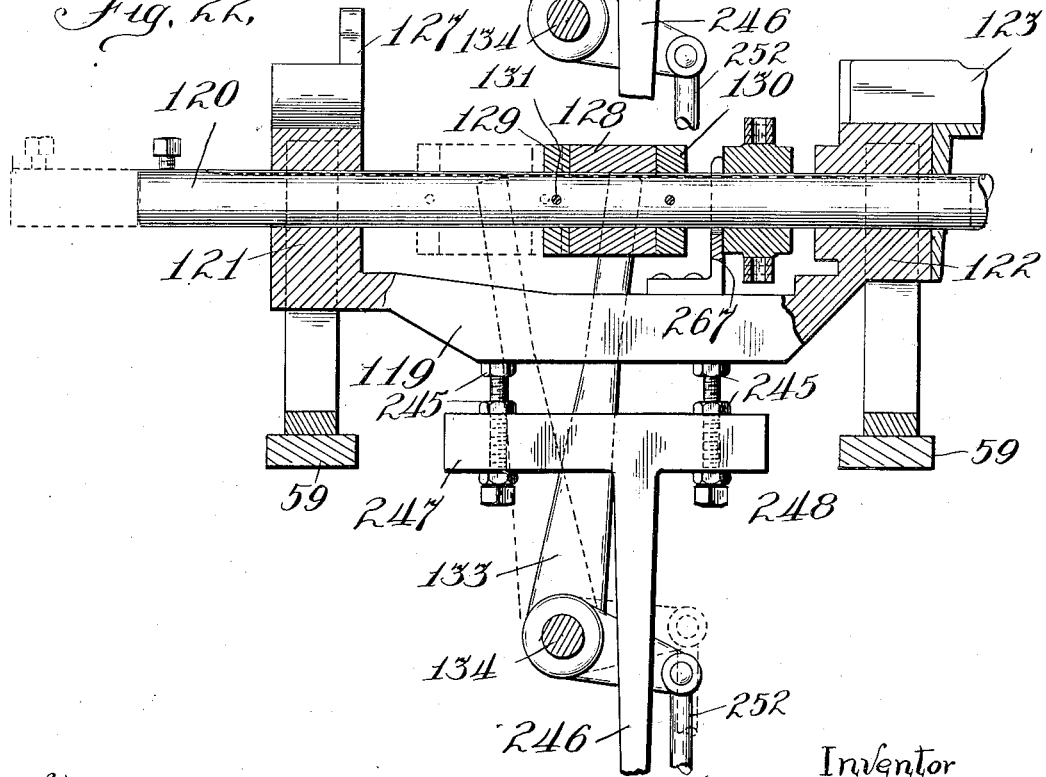
Witnesses
Milton Lenoir
E. M. Klatcher
Inventor
Hugh M. Marsh,
By Gillson & Gillson
Attorneys.

H. M. MARSH.
BROOM MAKING MACHINE.
APPLICATION FILED MAY 1, 1909.
944,803.
Patented Dec. 28, 1909.
15 SHEETS—SHEET 12.
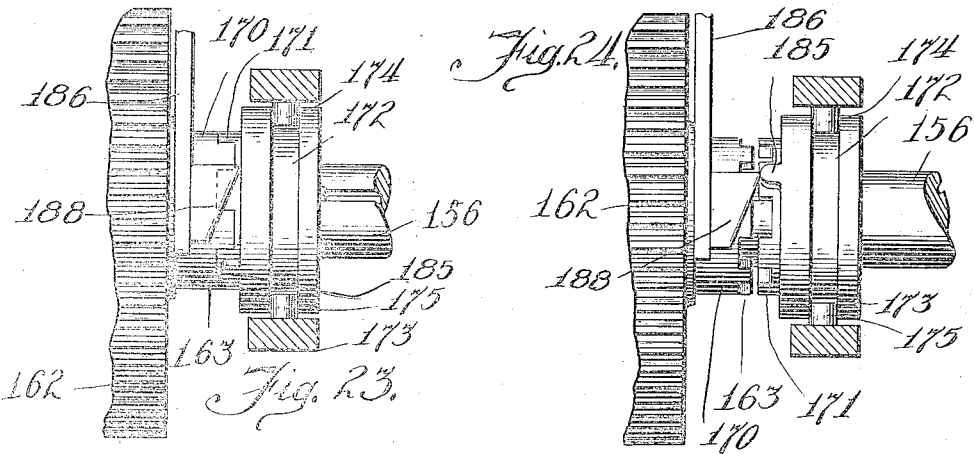
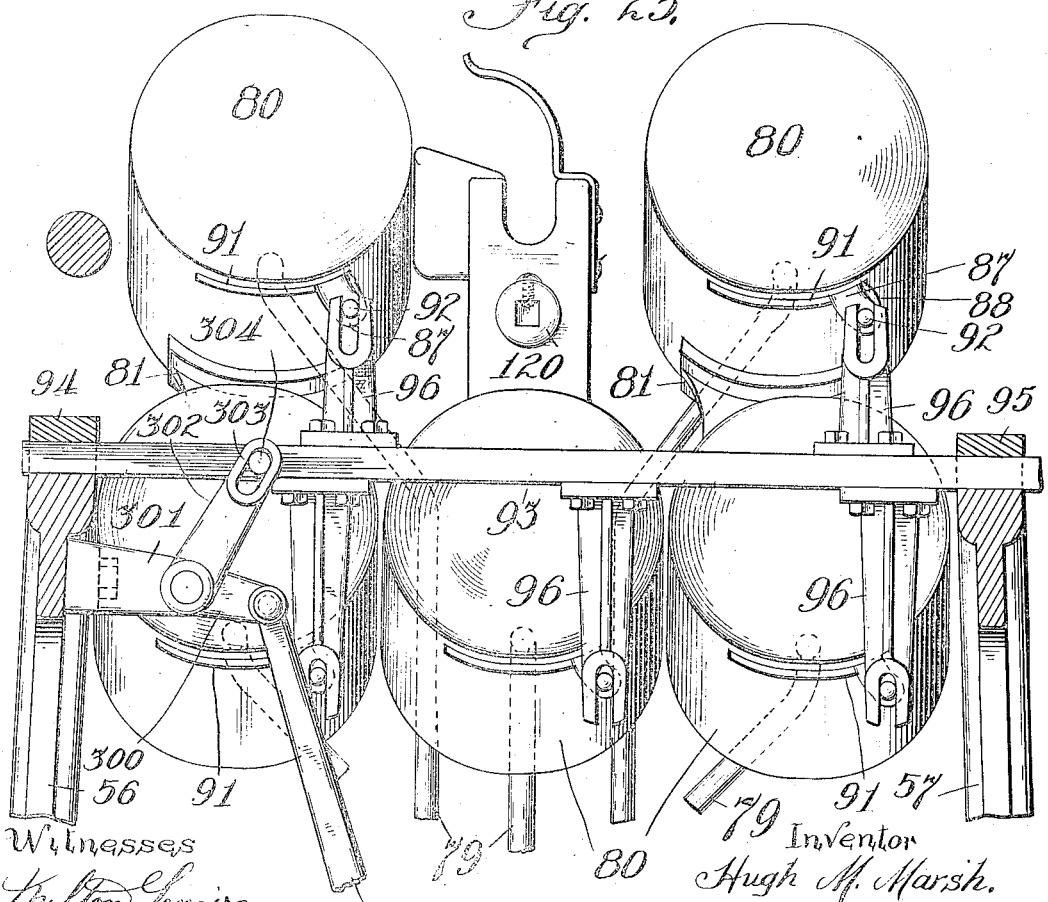

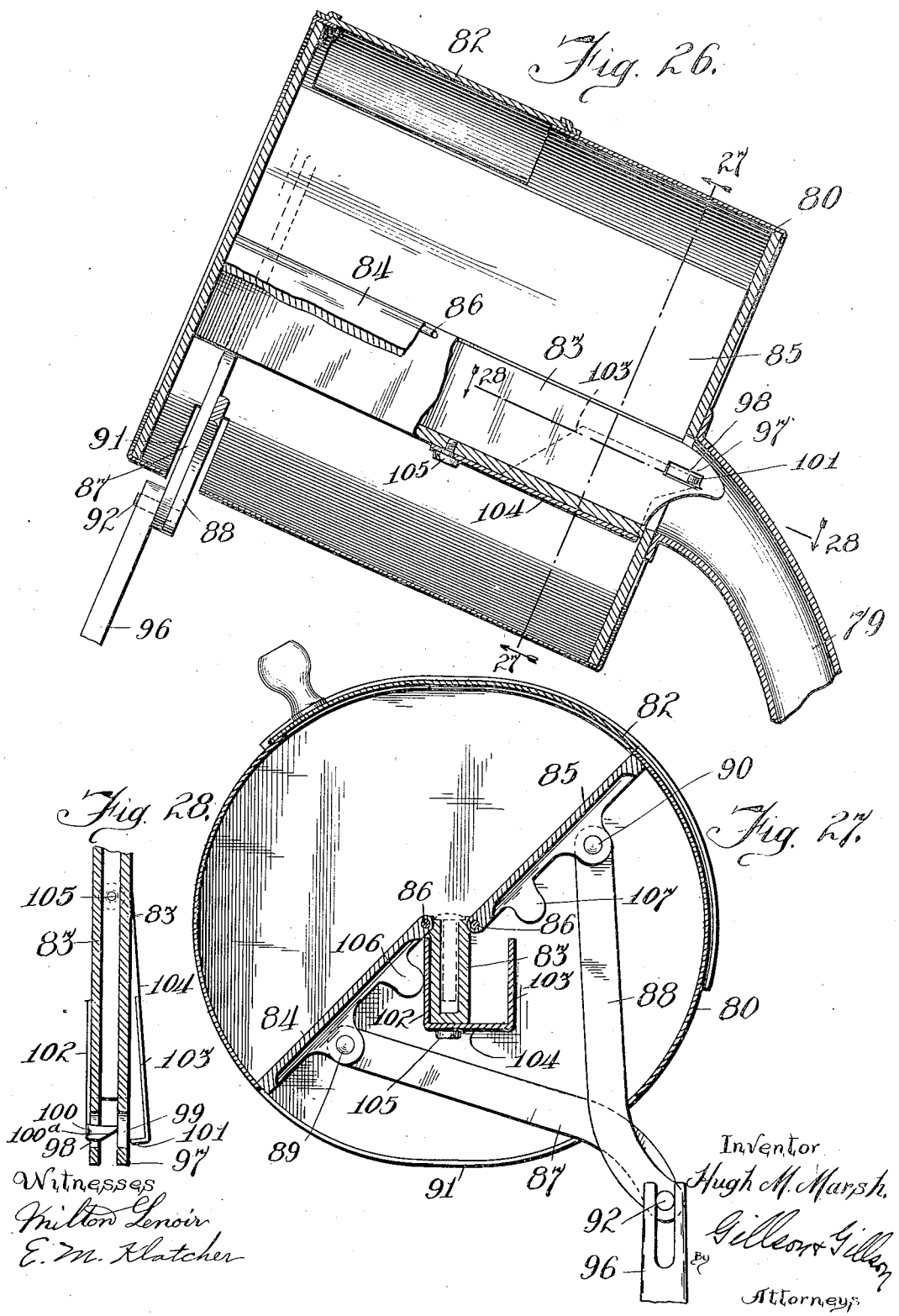

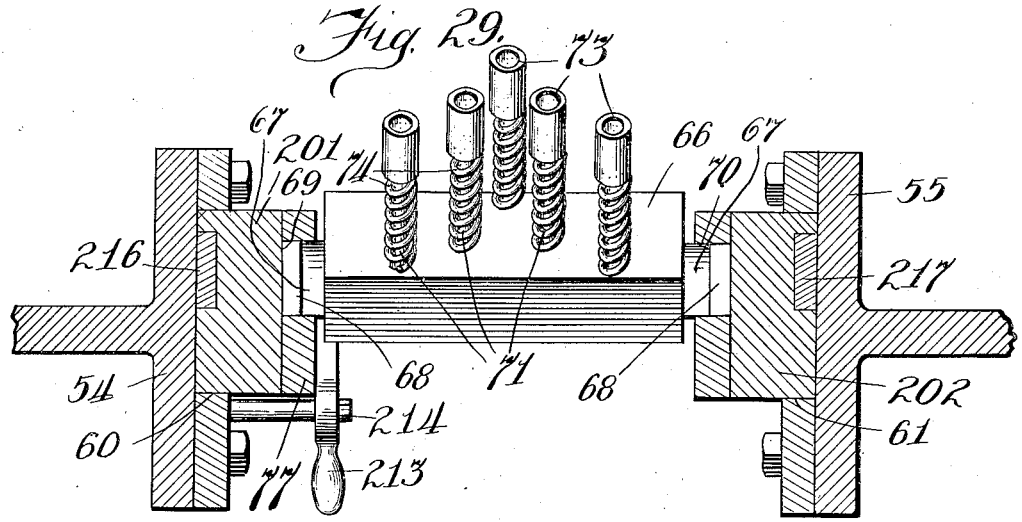
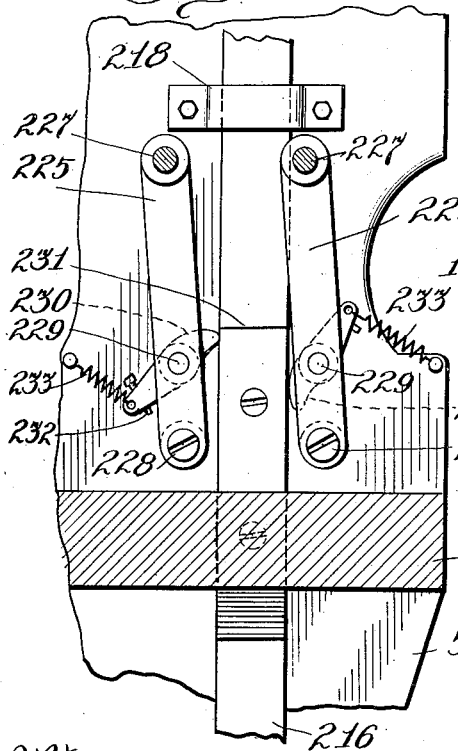
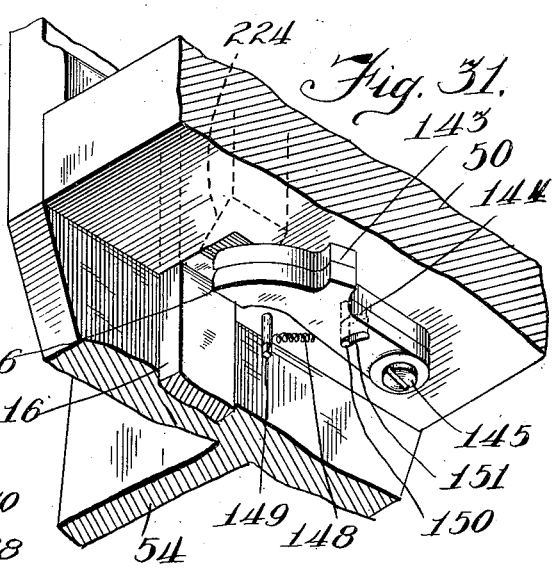

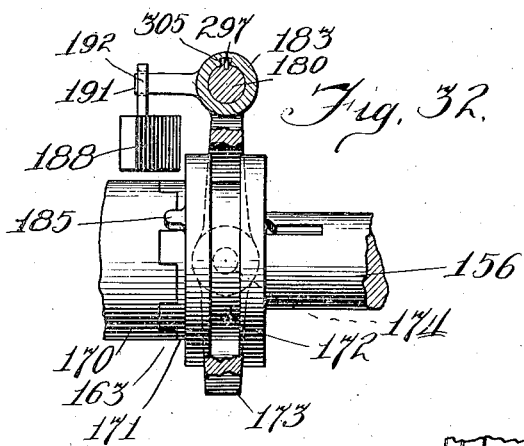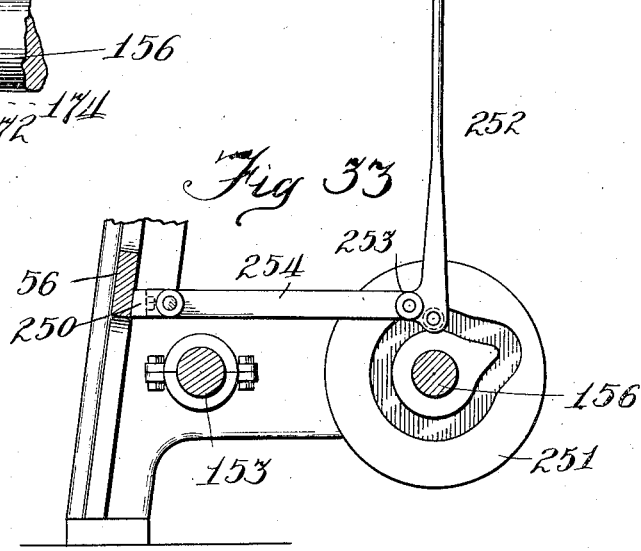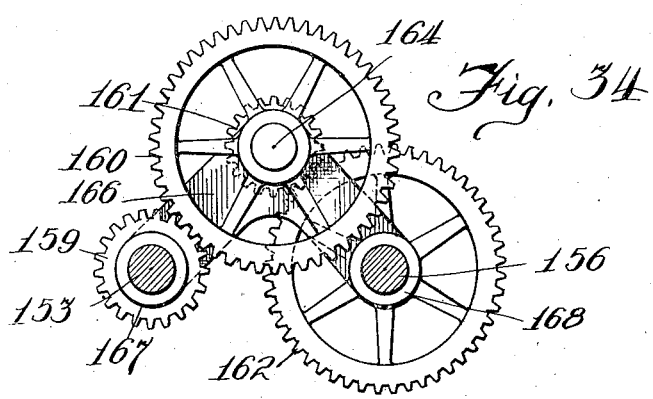

UNITED STATES PATENT OFFICE.

HUGH M. MARSH, OF CHICAGO, ILLINOIS.

BROOM-MAKING MACHINE.

944,803.   Specification of Letters Patent.   Patented Dec. 28, 1909.

Application filed May 1, 1909. Serial No. 493,323.

*To all whom it may concern:*

Be it known that I, HUGH M. MARSH, a citizen of the United States of America, and resident of Chicago, county of Cook, and State of Illinois, have invented certain new and useful Improvements in Broom-Making Machines, of which the following is a specification, and which are illustrated in the accompanying drawings, forming a part thereof.

The invention relates to machines for making brooms comprising a body of corn strands and a handle, the body of corn strands being bound together, in the operation of the machine, by a pair of clamping plates which also provide a socket for receiving the handle and into which socket the machine preferably inserts and secures the handle.

The object of the invention is to provide a machine capable of rapidly and efficiently producing brooms of improved construction.

The invention is exemplified in the structure to be hereinafter described, and illustrated in the accompanying drawings in which—

Figure 16:
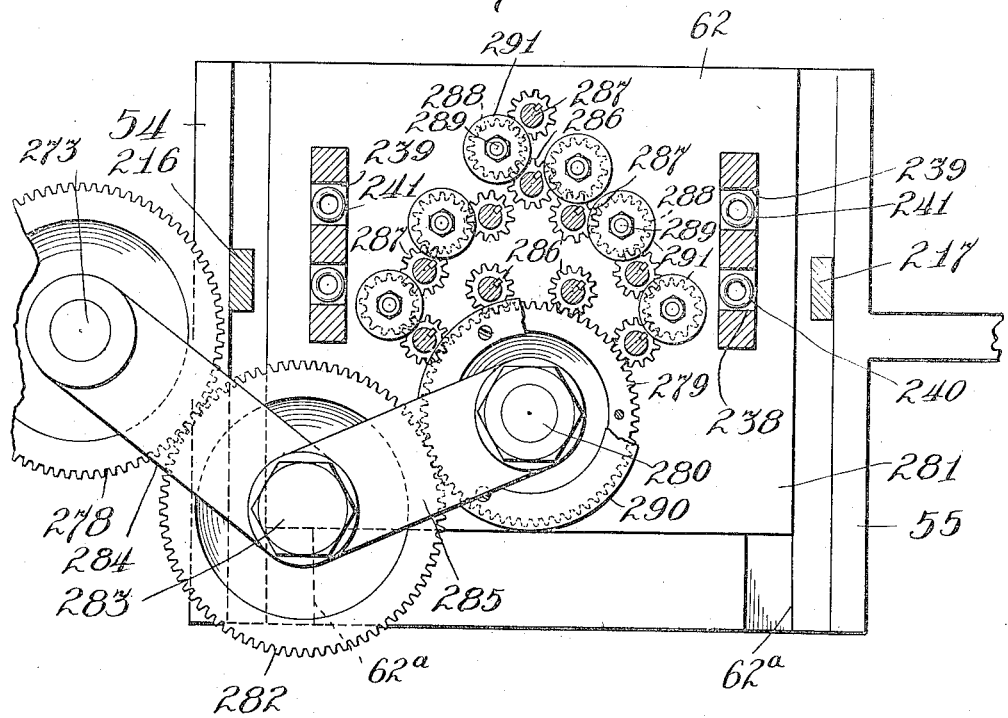
Figure 17:
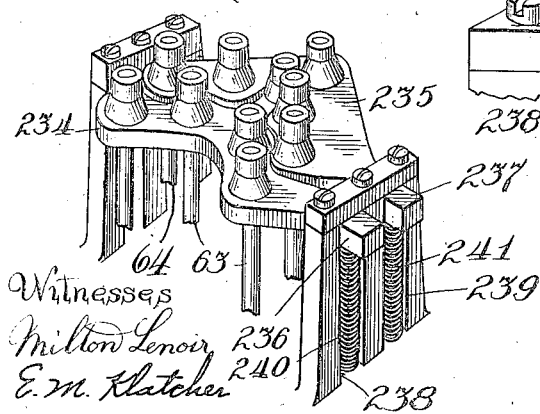
Figure 18:
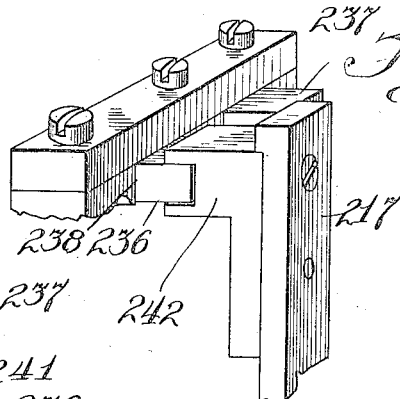

Figure 1 shows in front elevation a broom-making machine embodying the features of the invention; Fig. 2 is a side elevation of the same, some of the parts being broken away; Fig. 3 is a top plan view of the same; Fig. 4 is a plan sectional view taken on the line 4—4 of Fig. 2; Fig. 5 is a vertical cross-section taken on the line 5—5 of Fig. 4; Fig. 6 is a detail central vertical longitudinal sectional view of the machine, some of the parts being shown in elevation; Fig. 7 is a sectional view illustrating a detail shown in Fig. 6, drawn to an enlarged scale; Fig. 8 is an inverted plan sectional view taken on the line 8—8 of Fig. 1; Fig. 9 is a vertical cross-sectional view taken on the line 9—9 of Fig. 6; Fig. 10 is a vertical longitudinal sectional view taken on the line 10—10 of Fig. 1; Fig. 11 is a plan view of one of the clamping plates employed in the construction of brooms such as are produced by the machine; Fig. 12 is an end view of the same; Fig. 13 shows a pair of clamping plates similar to the single one illustrated in Figs. 11 and 12, but formed and fitted together after the manner effected by the machine in the production of a broom; Fig. 14 shows a rivet of the form which may be employed by the machine for securing the clamping plates illustrated in Fig. 13 together upon the body of corn strands constituting the head of a broom; Fig. 15 is a detail central vertical longitudinal sectional view illustrating parts of the machine located above those parts illustrated in Fig. 6; Fig. 16 is a detail plan sectional view of the machine taken on the line 16—16 of Fig 2; Figs. 17 and 18 are perspective views illustrating details of the machine more particularly shown in Figs. 3, 15 and 16; Fig. 19 is a perspective view illustrating a hopper employed upon the machine for receiving a quantity of broom handles and mechanism for inserting the handles into brooms produced by the machine; Fig. 20 is a detail sectional view taken on the line 20—20 of Fig. 19; Figs. 21 and 22 are detail central vertical longitudinal sectional views of the machine illustrating parts of the mechanism illustrated in Fig. 19; Figs. 23 and 24 are detail sectional views illustrating a clutch mechanism employed upon the driving shaft of the machine; Fig. 25 is a detail cross-sectional view taken on the line 25—25 of Fig. 2, and showing hoppers employed upon the machine for supplying a quantity of rivets which enter into the construction of the broom produced by the machine; Fig. 26 is a detail vertical sectional view illustrating one of the rivet hoppers shown in Fig. 25, some of the parts of the hopper being shown in side elevation; Figs. 27 and 28 are detail sectional views taken on the lines 27—27 and 28—28, respectively, of Fig. 26; Fig. 29 is a plan sectional view taken on the line 29—29 of Fig. 1; Fig. 30 is similar to a detail of Fig. 10 but shows some of the parts in a different position; Fig. 31 is a perspective view illustrating details shown in Fig. 8; Fig. 32 is a detail sectional view taken on the line 32—32 of Fig. 5; Fig. 33 is similar to a detail of Fig. 15, but drawn to a larger scale; and Figs. 34 and 35 are detail sectional views taken, respectively, on the line 34—34 of Fig. 4 and 35—35 of Fig. 15.

A pair of relatively-movable oppositely-facing pressure heads 50 and 51 are included in the construction of the machine as shown. Preferably the face of each of these pressure heads is shod with a die plate 48. These die plates provide seats for the members of a pair of clamping plates A (Figs. 11 and 12) which enter into the construction of a broom for binding the body of corn strands and the handle of the broom together. As shown, spring latches 52, carried by the pressure heads 50 and 51, project over the die plates 48 to hold the clamping plates A in place thereon when the pressure heads 50 and 51 are separated. The pressure heads 50 and 51, and the die plates 48 carried thereby, are provided with registering apertures, as 53 (Figs. 8 and 15), these apertures being also adapted to register with apertures b in the clamping plates A when the latter are seated in the die plates. Preferably the apertures 53 of the lower clamping head 51 are counterbored to the back of the die plate 48 carried thereby, as shown at 53ª (Fig. 15).

The parts of the machine are carried by a suitable framework. As shown, this framework comprises a base plate 49, upright standards 54, 55, rising from the base plate 49, and rectangular frame members 56, 57 (Figs. 2 and 3) extending rearwardly from the standards 54, 55, respectively. The rearwardly extending frame members 56, 57, tied together at their rear ends by a transverse frame member 58, and intermediate their ends by tie-rods as 59. One of the pressure heads, as 50, is rigidly secured in position between the standards 54, 55, and is downwardly facing. This pressure head thus serves as a tie member for firmly uniting the standards 54, 55, adjacent their higher ends. The companion pressure head 51 is upwardly facing and is mounted for vertical movement between the standards 54, 55, below the stationary pressure head 50. As shown, the pressure head 51 constitutes the top plate of an open rectangular frame 200, the side members 201, 202, of which run in slideways 60 and 61 (Fig. 29), respectively, formed on the inner faces of the standards 54, 55. The bottom member of the frame 200 takes the form of a T-shaped cross-head 200ª, which connects the members 201 and 202 at their lower ends and carries at the foot of the T a cam-engaging roller 203.

A carriage 62 is mounted for horizontal sliding movement in ways 62ª formed upon the back of the pressure head 50 between the higher ends of the standards 54, 55. A plurality of drill spindles 63, and spindles 64 for rivet-setting tools 65, each equal in number to the number of apertures b provided in one of the clamping plates A, are mounted for vertical sliding movement in the carriage 62. The members 63, 64, of each set of spindles are adapted to be brought alternately into register with the apertures 53 of the pressure head 50 by horizontal movement of the carriage 62 in the ways 62ª.

Provision is made for inserting rivets, as X (Fig. 14), upwardly into the broom structure held between the pressure heads 50 and 51, through each of the apertures 53 in the lower pressure head 51. To this end a tilting rivet carrier 66 is provided, and is preferably mounted for vertical sliding movement within the frame 200. As shown, a yoke-shaped member 66ª extends horizontally across the frame 200, and has its ends 68 slidingly mounted in vertical slideways 69, 70. (Fig. 29), formed upon the inner faces of the side members 201, 202, of the frame 200. Trunnions 67 are provided upon the ends of the rivet carrier 66, and these trunnions are rotatably mounted in the ends 68 of the yoke 66ª.

In its lowermost position illustrated in Fig. 6 of the drawings, the rivet carrier 66 is supported in an inclined position by means of a stationary bracket member 213, carried by one of the standards, as 54, to which it is fixedly secured by a bolt 214. When the rivet carrier 66 is raised from the position illustrated in Fig. 6, it is turned on the trunnions 67 and maintained in an upright position by means of a bar 77, which extends upwardly from the bracket 213 and is adapted to slidingly engage the forward edge 78 of the rivet carrier. Preferably the member 77 is secured to the inside face of the side member 201 of the sliding frame 200 adjacent the slideway 69. As shown the member 77 has a rounded lower end 77ª, whereby the turning of the carrier 66 to an upright position is effected, during the raising of the carrier, by a cam engagement between the rounded end of the bar and the forward edge 78 of the carrier. A plurality of plungers 71, equal in number to the number of apertures 53 provided in the clamping head 51, are mounted in the carrier 66. The outer end of each of these plungers is preferably concave, as shown at 72 (Fig. 7), to provide a seat for the head of a rivet X. For supporting the rivet upon this seat a sleeve 73 slides upon the end of each of the plungers 71. As shown, each of these sleeves is advanced to a position in which it projects beyond the end of the plunger by a spring 74, coiled about the plunger, the outward movement of the sleeve being limited by a set-screw 75, which enters a longitudinal slot 76 formed in the side of the plunger, through the wall of the sleeve.

For supplying rivets to all of the plungers 71 at suitable intervals, a plurality of rivet hoppers 80, preferably equal in number to the number of plungers, are provided. Each of these hoppers, as shown, has a discharge tube 79, and these discharge tubes are preferably so disposed within the machine that when the rivet carrier 66 occupies the inclined position (Fig. 6) at the limit of its downward movement in the frame 200, the outer end of each of the plungers 71 and the corresponding sleeve 73 registers with the mouth of one of the tubes.

Preferably each of the rivet hoppers 80 is supported by a bracket, as 81, secured to the framework of the machine in rear of the standards 54, 55. These hoppers are illustrated in detail in Figs. 25, 26, 27 and 28. As shown, each takes the form of a drum disposed in an inclined position and having an openable cover 82. Each of the delivery tubes 79 leads out of the lower end of one of the drums, being preferably connected thereto at a point slightly below the axis of the drum, as most clearly shown in Fig. 26. A channeled slideway 83, capable of receiving rivets X of the form illustrated in Fig. 14, in an upright position only, as shown by dotted lines in Fig. 27, extends through each of the drums 80 from end to end in line with the mouth of the delivery tube 79.

Means are provided for agitating the contents of the rivet hoppers to cause the rivets to pass the mouth of the channeled slideway 83, and thus continually maintain this slideway filled with rivets. As shown, wings 84, 85, are hinged to the side edges of the slideway 83, as at 86 (Figs. 26 and 27). These wings are equal in length to the corresponding inside dimension of the drum 80, and they extend to the sides of the drum, thereby constituting a movable bottom for the hopper. Provision is made for oscillating the wings 84, 85, in such a way that they will occupy alternate positions inclined upwardly and downwardly from the channeled slideway 83, the relation between the wings being preferably such that when one is upwardly inclined its companion is downwardly inclined, as shown in Fig. 27, whereby the rivets X contained within each of the hoppers are caused to roll from side to side of the hopper over the slideway 83.

As shown, links 87, 88, are connected to the under sides of the wings 84, 85, of each of the hoppers 80, as at 89, 90 (Fig. 27). These links extend through a slotted opening 91 in the wall of the hopper below the wings, and they are connected at their outer ends by means of a pin 92. For simultaneously swinging the links 87, 88, of all of the rivet hoppers 80, a slide-bar 93 (Figs. 2 and 25) extends across the machine and has its ends mounted in bearing blocks 94, 95, mounted on the side members 56, 57, of the machine frame. A plurality of forked bracket members 96, equal in number to the number of rivet hoppers 80, are carried by the slide-bar 93. As shown, the forked end of each of the brackets 96 engages the pin 92 employed for connecting the outer ends of the links 87, 88, of one of the rivet hoppers 80. It will thus be seen that a longitudinal movement of the slide-bar 93 will cause a simultaneous movement of the bottom members or wings 84, 85, of all of the rivet hoppers 80.

Provision is made for permitting the delivery of but one rivet at a time from each of the rivet hoppers 80 into the corresponding discharge tube 79, and this at the desired interval. It is also provided that while the rivets are retained in the channeled slideway 83 in an upright position, as shown by dotted lines in Fig. 27, their delivery to the tube 79 is in such a manner that they pass down the tube with the head of the rivet directed downwardly. As shown, the upper portions of the side walls of the channeled slideway 83 of each of the hoppers 80 are extended into the mouth of the corresponding tube 79, as at 97 (Fig. 26). These extensions 97 are apertured, as shown at 98, 99 (Figs. 26, 28), and fingers 100, 101, adapted to project through the apertures 98, 99, are provided for interrupting the movement of the rivets from the channeled slideway 83 into the tube 79.

Preferably the fingers 100, 101, are spaced apart in the direction of the length of the slideway 83, and that one in the rear, as 100, has a forwardly-directed cam face 100$^a$. As shown, these fingers are formed, respectively, upon the upturned side edges 102, 103, of a metal plate 104, pivotally secured to the under side of the channeled slideway 83, at 105. The fingers 100 and 101 are projected alternately into the path of the rivets, leaving the slideway 83, by oscillating the plate 104 upon its pivot 105. To this end cam lugs 106 and 107 are formed upon the under side of the wings or bottom members 84, 85, of the hopper 80. These cam lugs 106, 107, are adapted to engage the upturned side edges 102, 103, respectively, of the plate 104 to oscillate the plate as the wings or bottom member upon which each is formed approaches the limit of its downward movement. When the plate 104 is moved to the right, as viewed in Fig. 28, a rivet is discharged into the tube 79 by the cam finger 100. When the plate is moved in the reverse direction the rivets contained within the slideway 83 are permitted to move by gravity toward the mouth of the tube 79 against the finger 101. This finger then serves as a stop for maintaining that rivet nearest the tube in a proper position to be ejected by the cam finger 100 upon the next movement of the plate 104.

A hopper, generally designated by the numeral 108, is preferably provided upon the machine for containing a quantity of broom handles, as Y. This hopper is most conveniently supported from the frame members 57, 58, 59, of the machine, and from the standard 54, by brackets, as 109, 110 and 111. As shown, it takes the form of a skeleton framework comprising oppositely-facing inclined trough-shaped end members 112, 113, each being upturned and flared adjacent its higher end, as at 114, to provide a spacious receptacle. Stops 115, 116, are provided at the inner ends of the trough-shaped members 112, 113, to prevent the escape of the handles from the hopper by gravity, and the upper wall of each of the trough-shaped members 112, 113, is cut away adjacent the stops 115, 116, respectively, as shown at 117, 118 (Fig. 19), to permit the broom handles to be removed from the hopper, one at a time, by being lifted vertically out of the inner ends of the troughs 112, 113.

A vertically-movable carriage 119 is provided for removing the broom handles from the delivery end of the hopper 108, and for supporting the handle received from the hopper at each operation in a proper position to be inserted into the socket provided by the tubular portions $a$ of the clamping plates A as these plates are held in a position in which they are partially compressed upon the corn strands constituting the body of the broom, by the pressure heads 50 and 51. This carriage also supports an auger spindle 120 for boring out the corn strands at the base of the broom handle socket just described. As shown, the carriage 119 moves in vertical slideways 121, 122, mounted on horizontal cross-members 59 of the machine frame. The auger spindle 120 is journaled for rotation and longitudinal sliding movement in parts of the carriage 119 adjacent the vertical slideways 121, 122.

To provide a suitable support for a broom handle Y, the carriage is extended rearwardly beyond the slideway 122, this extension taking the form of a trough 123. Forks 124, 127, are mounted in the carriage 119 for lifting broom handles, one at a time, from the delivery end of the hopper 108. The arms of one of these forks, as 124, straddle the trough 123. In order that these forks may lift a handle Y from the hopper 108 whenever the carriage 119 is raised, they are laterally directed, and one of the arms, as 126, of each extends beneath the inner end of the hopper. The vertical movement of the carriage 119 is sufficient to cause a handle to be lifted by the arms 126 of the forks 124, 127, clear of the stops 115, 116. The handle then falls by gravity between the arms of the forks 124, 127, into the trough 123, and onto the base of the fork 127, which together provide a seat for the handle in the carriage 119. The handles contained within the hopper 108 move by gravity against the stops 115, 116, when the carriage 119 is lowered, the movement at other times being prevented by reason of the arms 126 of the forks 124, 127, each having a vertically-extended side face 126$^a$ designed to serve as a stop against which the handles remaining in the hopper 108 may bear when one is being removed by the forks.

The auger spindle 120 and the seat provided in the carriage 119 for the broom handle Y, are so disposed upon the carriage 119 that the auger spindle 120 is in line with the socket for the handle provided in the broom being produced by the machine when the carriage is elevated in the ways 121, 122, and the broom handle Y supported in the carriage is in line with this socket when the carriage is lowered. The augur spindle 120 is, therefore, preferably advanced for boring out the broom handle socket when the carriage 119 is elevated for the purpose of removing a broom handle from the delivery end of the hopper 108. For advancing the auger spindle, a sleeve 128 is mounted thereon between collars 129 and 130, rigidly secured thereto, as by means of set-screws 131. The sleeve 128 has formed upon one side an apertured lug 132, which slidingly receives a lever arm 133, having an oscillating movement, as by being mounted upon a rock shaft 134 which extends across the framework of the machine and has its ends journaled in bearing blocks, as 135, secured to the side members, as 56, of the machine frame. A plunger 136 runs in the trough 123 for advancing the broom handle to its seat in the broom being formed by the machine when the carriage 119 is lowered. This plunger is provided with lugs 137 which project outwardly through slots 138 in the side walls of the trough 123, and have secured thereto a yoke bracket 139. A link 140 connects the yoke bracket 139 with one arm of a bell-crank lever 141, which, as shown, is journaled in a bracket 142 secured to a cross-bar 142$^a$ of the rear frame member 58 of the machine.

The clamping plates A (Figs. 11 and 12) employed by the machine have lateral projections $c$ adapted to be compressed upon the sides of the broom head, as shown in Fig. 13. For forming these lateral extensions $c$ of the clamping plates A the stationary pressure head 50 of the machine is preferably provided at each side with a pair of laterally-movable die members 143, 144 (Figs. 1, 8 and 31). The members of each pair are pivotally secured to the under side of the pressure head 50 by a pin 145, and each member is provided with a rearwardly-extending cam lug 146 and with an inwardly-extending die lug 147. As shown, rearward movement of the members is effected by a spring 148, a single spring being sufficient for retracting both members of each pair. This spring is secured at one end to the pressure head 50, as at 149, and at the other end to a pin 150 firmly secured in the member 143 and extending through the member 144. In order, however, that forward movement of the two members 143, 144, of each pair may be independent, a slotted opening 151 is provided in the member 144 for receiving the pin 150.

Power is applied to the moving parts of the machine preferably through a driving pulley 152 mounted upon the end of a driving shaft 153, which, as shown, is journaled in the machine frame at 154, 155. The driving shaft 153 will most conveniently be rotated continuously during the operation of the machine. A cam shaft 156, preferably located upon the median line of the machine adjacent its base and journaled at one end in a bearing block 157, rising from the base plate 49 between the standards 54, 55, and at the other end in a bearing bracket 158 carried by the rear frame member 58, is intermittently rotated from the driving shaft 153 by means of speed-reducing gears 159, 160, 161 and 162. The gear 162 is loosely mounted on the cam shaft 156, and is adapted to be operatively connected to the cam shaft by means of clutch mechanism, generally designated 163. The gear 159 is fixed to the driving shaft 153. The intermediate gears 160 and 161 are mounted on a stub shaft 164 journaled at 165 in a bracket member 166, which is carried by the driving shaft 153 and the cam shaft 156 through having collars 167 and 168 formed upon its ends for rotatably receiving these shafts respectively.

The various parts of the machine, as shown, are designed to perform the several operations incident to the production of a broom during a single revolution of the cam shaft 156. A foot pedal 169 is therefore provided for closing the clutch 163, and provision is made for automatically opening this clutch when the cam shaft 156 has made one complete revolution. The foot pedal 169 preferably takes the form of a bell-crank lever having an upstanding arm 179. It is pivotally supported on the frame of the machine, as by being provided with trunnions 176, which have bearings, respectively, in lugs 177 and 178 formed on the standard 55.

As shown, the gear 162 is fixed against longitudinal movement on the cam shaft 156, and has formed upon its hub a rearwardly-directed clutch face 170. A forwardly-facing clutch member 171 (Fig. 23) is splined to the cam shaft in rear of the gear 162, and has a circumferential groove 172 formed in its rim. A yoke 173, which, as shown, takes the form of a complete ring surrounding the rim of the movable clutch member 171, has instanding lugs 174, 175, which run in the groove 172. This yoke has formed upon its upper edge a hub member 183 (Fig. 5), and is thereby rigidly mounted upon a rock shaft 180 which preferably extends across the machine immediately over the cam shaft 156, and has its ends journaled in bearing members 181, 182, carried by the side frame members 56 and 57, respectively.

For automatically opening the clutch 163, a cam lug 185 is formed upon the inner face of the rim of the movable clutch member 171, and coöperates with a cam shoe 188. In order that the cam shoe 188 may be disengaged from the cam lug 185 to permit the closing of the clutch to start the machine, the cam shoe is preferably formed upon a lever arm 186, which is pivotally secured at one end to the bearing bracket 182, as at 187, and rides loosely at the other end upon the hub of the clutch. To prevent lateral displacement of the lever-arm 186 by contact between the cam lug 185 and the cam shoe 188, the lever arm is preferably made of sufficient thickness to bear against the face of the gear 162.

The rock shaft 180 is turned by depressing the foot pedal 169 to close the members of the clutch 163. To this end a link 184 connects a crank-arm 190 of the rock shaft with the upstanding arm 179 of the foot pedal 169. A second crank-arm 191 of the rock shaft 180 is provided for raising the lever arm 186 and its cam shoe 188 when the rock shaft 180 is turned by the foot pedal. As shown, the crank-arm 191 enters the loop of a U-shaped bracket 192, secured to the lever-arm 186 adjacent its pivot. In order that the raising of the lever 186 may precede the closing of the clutch 163, the hub 183 of the yoke 173 is connected to the rock shaft 180 by a key 297 (Fig. 32), which is of less width than the keyway 305 provided therefor, whereby the yoke 173 will not be moved during the initial turning of the rock shaft. Provision is also made for manually arresting the movement of the machine by opening the parts of the clutch 163 at any time, as when some emergency may arise to require it. To this end a hand lever 193 is pivotally secured to the machine in a conveniently accessible position, as at 194. This hand lever is provided with a portion 195, which projects beyond the pivot 194 from the body of the lever, and bears upon a slide rod 196, which has a sliding support in the framework of the machine, as at 197, and is directly connected to the yoke 173, as at 198 (Figs. 2 and 5). Preferably all the movable parts of the machine, except the rotating drill spindles 63, the rivet-setting spindles 64, and the auger spindle 120, are operated from the cam shaft 156.

For operating the movable clamping head 51, a disk cam 199 is most conveniently employed. As shown, this cam is mounted on the cam shaft 156 adjacent its forward end between the standards 54, 55, and coöperates with the cam-engaging roller 203. A cam arm 204 is mounted on the cam shaft 156 in rear of the disk cam 199 for raising the rivet carrier 66 in the frame 200. A depending bracket 205 is secured to the yoke member 66ᵃ which supports the rivet carrier. A curved cam-engaging link 207 is pivotally attached to the lower end of the bracket 205 for coöperating with the cam arm 204. In order to secure the desired range of vertical movement of the rivet carrier 66, the cam arm 204 takes the form of a hook, the point of the hook being engaged with a recess 208 formed in the end of the link 207, when the parts are in their lowermost position, and the rounded back 209 of the hook being engaged with the end of the link 207 when the parts are in an elevated position. If desired the movement of the link 207 may be controlled as by a curved guide plate 210. As shown, this guide plate is rigidly fixed in position as by being secured to the standard 55, and it is provided with a curved slot 211, within which runs a stud 212 carried by the link 207 adjacent its outer end. The downward movement of the rivet carrier 66 is effected by gravity when the round end of the hook 209 has passed out from beneath the end of the link 207 during the rotation of the cam shaft 156.

A pair of vertically-movable cam bars 216, 217, are provided for operating the laterally-moving forming dies 143, 144, for horizontally shifting the carriage 62 and for advancing the drill spindles 63 and the rivet-setting tools 65 in turn. As shown, one of these cam bars extends upwardly along the inner face of each of the standards 54, 55, behind the slideways 60, 61, their higher ends being guided by bearings 218, 219 (Fig. 1) secured to the standards 54, 55, respectively. At their lower ends the cam bars 216, 217, are connected by a strap 220 (Figs. 1, 2 and 6), this strap being bent rearwardly and downwardly intermediate its ends and being there provided with a cam roller 221, which coöperates with a plate cam 222 mounted on the cam shaft 156 in rear of the cam arm 204.

The face of the cam plate 222 is provided with a cam groove 223 for receiving the roller 221, this cam groove being suitably formed to support the cam bars 216, 217, in an elevated position when the cam shaft 156 is brought to rest by the automatic opening of the clutch 163, and to vertically reciprocate these cam bars twice during the latter part of each revolution of the cam shaft. Intermediate their ends the cam bars 216, 217, are each provided with an inwardly and downwardly-facing cam block 224 (Figs. 1, 8 and 31). These cam blocks are for swinging the forming dies 143, 144. As shown, they are engageable with the cam lugs 146 of the members 142, 144, during the downward movement of the bars 216, 217, the upper member 143 being engaged and operated in advance of the member 144, thus providing for the overlapping of the lateral projections c of the upper and lower clamping plates A, as shown in Fig. 13. The forming members 143, 144, are returned to inoperative position by the springs 148 when the cam blocks 146 are withdrawn from contact therewith by upward movement of the bars 216, 217.

For longitudinally sliding the drill carriage 62, links 225, 226, connected to the carriage at their upper ends, as at 227 (Fig. 10) and to the standards 54, 55, at their lower ends, as at 228, are provided at each side of the carriage. These links are swung during the upward vertical movement of the cam bars 216, 217. As shown, each of the links 225, 226, has pivotally secured thereto, as at 229, a swinging cam member 230, adapted to coöperate with a cam shoulder on each of the cam bars 216, 217, as at 231 (Figs. 1 and 10). The swinging of each of the cam members 230 is limited by means of a stop 232, which, as shown, takes the form of an adjustable set-screw set into the cam member in rear of its pivot 229 and engageable with the side face of the corresponding cam bar, as 216.

Normally the cam members 230 are yieldingly maintained in a substantially horizontal position by means of springs 233, each of which is secured at one end to a side wall of the carriage 62, and at the other to the cam member adjacent its rear end. At one upstroke of the cam bars 216, 217, the swinging cam member 230 of one of the links 225, 226, of each pair will be raised by contact therewith of the cam shoulder 231 until the stop 232 contacts with the adjacent side edge of the cam bar 216. A continued upward movement of the cam bars, as 216, will then effect a horizontal movement of the carriage 62 through a cam engagement of the cam shoulder 231 with the now rigid cam block 230 (Fig. 30). This movement of the carriage 62 and the corresponding movement of the links 225, 226, will bring the swinging cam block 230 of the other link, as 226, of each pair into contact with the side face of the cam bar, as 216, in front of the cam shoulder 231, as in Fig. 30. Upon the succeeding downstroke of the cam bar, as 216, the last-mentioned cam block 230 will be turned on its pivot by the spring 233 when released by the cam shoulder 231, and will then be left in proper position to be engaged by the cam shoulder 231 upon the next succeeding upward movement of the cam bars, as 216, for the purpose of producing movement of the carriage 62 in the reverse direction.

As shown, provision is made for vertically advancing all of the drill spindles 63 simultaneously, and for advancing all of the rivet-setting tools 65 simultaneously but independently of the drill spindles 63. To this end all of the drill spindles 63 and all of the spindles 64 for the rivet-setting tools 65, are connected at their upper ends by cross-heads, as 234, 235, most clearly shown in Figs. 3 and 17. Each of these cross-heads is mounted for vertical sliding movement in the carriage 62, each, as shown, being provided with lateral extensions designated 236 and 237, respectively, which project, respectively, through vertical slideways 238 and 239 formed in the side walls of the carriage 62. Preferably the cross-heads 234 and 235, with the spindles 63 and 64 carried thereby, are each normally supported in their elevated position by means of springs, as 240 and 241, housed within the slideways 238 and 239, respectively, and bearing upwardly upon the lateral projections, as 236 and 237 of the cross-heads.

The cam bars 216 and 217 are each provided at their upper end with an inwardly-facing fork 242 (Fig. 18). These forks are adapted to receive the lugs 236, 237, the former being engaged with the forks when the carriage 62 is in a horizontally-retracted position and the latter being engaged therewith when the carriage 62 is in a horizontally advanced position.

For vertically shifting the carriage 119 which supports the auger spindle 120 and the broom handle forks 124, 125, a cam 244 is preferably provided. As shown, this cam is mounted on the cam shaft 156 in rear of the clutch 163. A vertically-movable pillar 246 coöperates at its lower end with the cam 244 and extends upwardly therefrom to the carriage 119. At its upper end the pillar 246 is provided with a flattened T-head 247 (Figs. 21 and 22). To this T-head the carriage 119 is adjustably secured through the medium of set-screws 248. As shown, these set-screws pass loosely through the arms of the T-head 247 of the pillar 246 into the carriage 119, the T-head of the pillar being positioned thereon by clamping nuts 245. To prevent horizontal deflection of the lower end of the pillar 246 by the rotation of the cam 244, a link 249 (Fig. 4) is connected at one end to the pillar and at the other to a bracket 250 secured to the side member 57 of the machine frame.

As shown, a two-faced cam plate 251 is mounted on the cam shaft 156 in rear of the cam 244. The forward cam face of this cam member, as shown, serves for advancing and retracting the auger spindle 120, while the rear cam face of the member is for longitudinally shifting the plunger 136, in the broom handle trough 123. A pitman 252, connected at its upper end to one arm of the bell-crank lever 133, coöperates at its lower end with the forward cam face of the cam member 251. Horizontal displacement of the lower end of the pitman 252 is prevented by means of a link 254, connected at one end to the pitman 252 and at its other end to the bracket 250. A link 255, connected at its upper end to one arm of the bell-crank lever 141, coöperates at its lower end with the rear cam face of the cam member 251. Horizontal displacement of the lower end of this link is prevented by means of a connecting member 257, secured at one end to the lower end of the link 255, and at its other end to the bracket member 250.

Means are provided for reciprocating the slide-bar 93 during each revolution of the cam shaft 156 and thereby agitating the contents of the rivet hoppers 80 and delivering therefrom a single rivet into each of the discharge tubes 79. As shown, an eccentric 298 is mounted on the cam shaft 156. A pitman 299, operatively connected with the eccentric 298 at its lower end, extends upwardly therefrom within the frame of the machine in an inclined position, and is connected at its upper end to one arm of a bell-crank lever 300, pivotally supported in a bracket member 301 which is preferably secured to the side frame member 57. The other arm, as 302, of the bell crank lever 300 is slotted, as shown at 303, and a pin 304, mounted in the slide-bar 93, is engaged with the slot 303.

As shown, the auger spindle 120, the drill spindles 63, and the spindles 64 of the rivet-setting tools 65 are continuously rotated during the operation of the machine from the driving shaft 153. To this end a countershaft 258 (Fig. 3), extending along one side of the frame-work of the machine directly over the driving shaft 153, and journaled adjacent one end in a bearing bracket 259 secured to the standard 54, and adjacent the other end in a bearing bracket 260 mounted upon the top of the rearwardly-extended portion of the machine frame, is provided. This countershaft is continuously driven by means of a sprocket chain 261 (Fig. 1) which turns over sprockets 262 and 263, mounted, respectively, on the driving shaft 153 and on the countershaft. Driving connection between the auger spindle 120 and the countershaft 258 is directly and continuously established by means of a sprocket chain 264. This sprocket chain turns over a sprocket 265 rigidly mounted on the countershaft 258, and over a sprocket 266 (Figs. 21 and 22), splined to the auger spindle 120. Horizontal displacement of the sprocket 266 is prevented by means of a forked bracket 267, secured to the carriage 119 and straddling the auger spindle 120 in front of the sprocket.

The mechanism provided for continuously driving the drill spindles 63 and the spindles 64 is most clearly illustrated in Figs. 1, 15 and 16. A vertical shaft 273 is journaled in bearings 274, 275, secured to the side wall of the standard 54, and is connected at its lower end by bevel gears 276, 277, with the countershaft 258. A spur gear 278 is fixed to the shaft 273 adjacent its higher end, and a similar gear 279 is mounted upon a stub shaft 280 secured to a shelf 281 of the horizontally movable carriage 62. The gears 278 and 279 are operatively connected by means of an intermediate gear 282. This intermediate gear is rotatably mounted upon a bolt 283, which is also employed for connecting the members 284, 285, of two pairs of toggle links having their outer ends pivotally mounted upon the shaft 273 and the stub shaft 280, respectively, above and below the gears 278 and 279. Pinions 286 and 287 are splined to the spindles 63 and 64, respectively, and rest upon the shelf 281. Certain of the pinions 286 mesh directly with the gear 279. The remaining pinions 286 and all of the pinions 287 are operatively connected by intermediate gears 288, mounted upon stub shafts 289, fixed in the shelf 281. To prevent vertical displacement of the pinions 286, 287, from the shelf 281 when the spindles 63 and 64 are vertically reciprocated, the driving gear 279 and the intermediate gears 288 are each provided upon their upper face with a projecting flange, as 290 and 291, which overhangs the intermeshing pinions, as 286 and 287.

The operation of the machine, as shown, for the formation of a broom is as follows:—Power is applied to the belt pulley 152 mounted on the driving shaft 153, and the drill spindle 120 and the spindles 63 and 64 are continuously rotated thereby in the manner just described. The gear 162, the hub of which constitutes one member of the clutch 163, is also continuously rotated, through being in gear connection with the driving gear 153. A clamping plate A of the form illustrated in Figs. 11 and 12 of the drawing, is manually placed in the die plate 48 of each of the pressure heads 50 and 51, when the cam shaft 156 is at rest; the spring latches 52 serving to hold these plates in position so long as the pressure heads 50 and 51 are separated. A quantity of broom corn (not shown), sufficient for the formation of the body of a broom, is then manually placed between the pressure heads 50 and 51, and the cam shaft 156 is set in motion by depressing the treadle 169, whereby the parts of the clutch 163 are brought together. The initial rotation of the cam 199, located upon the forward end of the cam shaft 156, raises the clamping head 51 and causes the plates A to be partially compressed upon the bundle of corn. The carriage 119 is now raised by the action of the cam 244 upon the pillar 246, and the auger spindle 120 is advanced to cause the auger (not shown) which it carries to enter the bundle of broom corn through the tubular socket formed by the fitting together of the shanks a of the clamping plates A carried by the upper and lower pressure heads 50 and 51. This advance of the auger spindle 120, and its retraction immediately upon its having bored out the broom corn to form a proper seat for the inner end of a broom handle, are effected by the swinging of the bell-crank lever 133 through the action of the cam member 251 upon the lower end of the pitman 252. During the raising of the carriage 119 the forks 124, 127, lift a broom handle from the ends of the troughs 112, 113, permitting it to fall by gravity to its seat on the carriage 119, including the trough 123. Immediately upon the retraction of the auger spindle 120 the carriage 119 is lowered by the cam 244, thereby permitting the next succeeding broom handle contained in the troughs 112, 113, of the hopper 108, to be advanced, by gravity and by the pressure of the broom handles behind it, upon the stops 115, 116, in position to be engaged by the forks 124, 127, when the carriage 119 is again raised.

When the carriage 119 is lowered, the handle Y contained within the trough 123 is brought into line with the socket provided for its inner end by the tubular shanks a of the clamping plates A, and by the opening bored out of the body of corn strands by the auger mounted in the spindle 120. The inner end of the handle is now deposited in this socket by a movement of the plunger 136 in the trough 123, the movement of the plunger being produced by a swinging of the bell-crank lever 141 from the rear cam portion of the cam member 151. Up to this time the clamping plates A have been supported by the pressure heads 50 and 51 in a position in which they are partially compressed upon the corn strands. Upon the insertion of the handle in the manner just described, a further upward movement is imparted to the lower pressure head 51 by the cam 199, thus causing the body portions of the clamping plates A to be firmly compressed upon the corn strands, and the corn strands and the tubular portion a of the clamping plates A to be firmly compressed upon the handle Y. After the insertion of the handle Y, the plunger 136 is returned to the outer end of the trough 123 by a reverse movement of the bell crank lever 141, imparted thereto by the cam member 151. The cam bars 216, 217 (Figs. 1, 10 and 18), are now lowered, through the action of the cam 222 upon the cam roller 221. Upon the initial downward movement of the cam bars 216, 217, the laterally swinging die members 143 and 144 (Fig. 31) are operated by contact of the cams 224 carried by the bars 216, 217, with the heels 146 of these die members, the upper die member 143 being operated in advance of the lower one designated 144. This movement of the die members 143, 144, causes the turning in of the lateral extensions c of the clamping plates A on the side edges of the body of broom corn (Fig. 13). In moving downward the cam bars 216, 217, draw with them the cross-head 234, by reason of the engagement of the lateral extensions 236 of this cross-head, with the forks 242 mounted upon the upper ends of the cam bars.

The downward movement of the crosshead 234 causes the drills carried by the drill spindles 63 to enter the body of broom corn and the handle through the apertures 53 in the upper pressure head 50, and through the corresponding apertures $b$ in the clamping plates A mounted therein. That one of the drills which registers with the apertures $b$ in the shank $a$ of the clamping plate A enters the handle of the broom. The remaining drills enter the body of broom corn. The cam bars 216 and 217 are now raised by the cam 222 for retracting the drill spindles 63 and for shifting the carriage 62 to bring the rivet-setting tools 65 into register with the holes just drilled in the body and handle of the broom. Fig. 10 of the drawings illustrates the position of the parts when the cam bars 216, 217, are being raised for this purpose. During this raising movement the cam shoulder 231 contacts with the swinging cam member 230, first turning it from a horizontal to a substantially vertical position without imparting any movement to the links 225, 226, or the carriage 62. When the cam bars 216, 217, have so nearly reached their completely elevated position that the forks 242 register with the laterally-projecting lugs 237 formed on the ends of the crosshead 235, the swinging cam member 230 has reached a position in which its turning movement is arrested by contact of the stop 232 with the side of the cam bar, as 216. By a cam engagement of the shoulder 231 with the rounded end of the cam member 230, a quick lateral movement of the links 225, 226, is now effected, thereby shifting the carriage 62. This horizontal movement of the carriage brings the spindles 64 into alinement with the apertures previously produced by the drills carried by the drill spindle 63, and moves the lugs 236, formed on the ends of the cross-head 234, out of engagement with the forks 242, substituting in their place in the forks the lugs 237 formed on the ends of the cross-head 235. The position of the cam bar 216 and links 225, 226, after the shifting of the carriage 62 just described, is illustrated in Fig. 30 of the drawings. The rotation of the cam shaft 156 has now been sufficient to bring the cam arm 204 into contact with the lower end of the link member 207. A rivet X has also by this time been deposited from one of the hoppers 80 into each of the sockets 73 provided upon the ends of the spindles 71 mounted in the rivet carrier 66. This latter is effected by an oscillation of the bottom members 84, 85, of the hoppers 80 produced through a reciprocation of the bar 93 by the eccentric 298. During this oscillation of the members 84, 85, the rivets contained within each of the hoppers 80 have been caused to roll twice across the corresponding chute 83 for the purpose of keeping it filled with rivets, and the fingers 100, 101, have been operated by contact of the cam lugs 106, 107, with the member 104 to discharge a single rivet from the end of each chute into the corresponding tube 79. The rivet carrier 66 is now moved upward in the frame 200 by the engagement of the cam arm 204 with the link member 207, the carrier 66 being turned to and maintained in an upright position when it has been raised far enough to engage the bar 77, which extends along the inside face of the side member 201 of the frame 200. The sleeves 73, provided upon the ends of the spindles 71, enter the counterbored portions 53$^a$ of the openings 53 in the pressure head 51 during the raising of the rivet carrier 66, and engage the under side face of the die plate 48 carried thereby. A further movement of the rivet carrier causes the sleeves 73 to be depressed upon the spindles 71 against the effort of the springs 74, thus permitting the rivets X carried by the spindles to be passed up through the aperture 53 in the die plate 48 through the apertures $b$ in the plates A, and through the aperture in the body or handle of the broom previously produced by the drills carried by the drill spindles 63.

It will be observed that the aperture 53 in the die plate 48 must be sufficiently large to permit the head of the rivet X to be passed up snugly against the under side face of the clamping plate A. In order, therefore, that the point of the rivet may be made to enter the aperture $b$ in the clamping plate A with certainty, laterally-yielding guide members 292, 293 (Fig. 35), are provided in the pressure head 51 at the base of the counterbored part 53$^a$ of each of the apertures 53. These guide members have a sliding movement in ways 294, 295, and each is advanced to operative position by a spring 296, coiled about its stem. As shown, the under face of these guide members is inclined to facilitate a centering of the rivet as it is advanced by the upward movement of the spindles 71, and to engage the end of the spindles by a cam action whereby the guide members are displaced against the effort of the springs 296 to permit the end of the spindles 71 to be forced snugly up against the heads of the rivets when the latter are in place. The cam bars 216 and 217 are now again lowered by the cam 222. During this downward movement they bring with them the cross-head 235, causing the rivet-setting tools 65 to be advanced upon the ends of the rivets projecting through the apertures $b$ of the upper clamping plate A. The operation of these rivet-setting tools completes the formation of a broom. The rivet-setting tools 65 are raised to an inoperative position, and the lower pressure head 51 is lowered to release the finished broom by a further turning of the cam shaft 156. During the raising of the cam bars 216, 217, incident to the retraction of the rivet-setting tools 65, the cam shoulders 231 engage the swinging cam pieces 230 carried by the links 226, thereby causing a return of the carriage 62 to its initial position illustrated in Figs. 17 and 18, wherein the drill spindles 63 are in alinement with the apertures 53 of the pressure heads 50 and 51, and the laterally-projecting lugs 236 provided upon the ends of the cross-head 234 are engaged with the forks 242 provided upon the higher ends of the cam bars 216, 217. The cam shaft 156 is now automatically brought to rest by a separation of the members of the clutch 163, As shown, this is effected by contact of the cam lug 185 formed on the movable member 171 of the clutch with the cam shoe 188 carried by the bar 186. The operations of the machine may be repeated upon depressing the treadle 169 whenever clamping plates A have been applied to the pressure heads 50 and 51, and broom corn, for the formation of the body of a broom, has been introduced between these pressure heads.

I claim as my invention—

1. In a broom making machine, in combination, a pair of coöperating oppositely-facing apertured broom-head forming dies, rivet-delivering means operable through the aperture of one of the dies, and rivet-setting means operable through the aperture of the other die.

2. In a broom making machine, in combination, a pair of coöperating oppositely-facing apertured broom head forming dies, drilling means and rivet-setting means operable in succession through the die apertures, and rivet-delivering means operable through the apertures of the die other than the one through which the rivet-setting means operates.

3. In a broom making machine, in combination, a pair of coöperating oppositely-facing apertured broom head forming dies, drilling means and rivet-setting means operable in succession through the aperture of one of the dies, and rivet-delivering means operable through the aperture of the other die.

4. In a broom making machine, in combination, a pair of coöperating oppositely-facing apertured pressure plates, rivet-delivering means operable through the aperture of one of the plates, a movable carriage back of the other plate, and a drill and a rivet-setting tool mounted in the carriage and adapted to be brought alternately into register with the plate aperture by the movement of the carriage.

5. In a broom making machine, in combination, a pair of coöperating oppositely-facing apertured broom head forming dies, a rivet hopper, a rivet carrier receiving from the hopper and adapted to enter the aperture in one of the pressure plates, and rivet-setting means operable through the aperture in the other die.

6. In a broom making machine, in combination, a pair of coöperating oppositely-facing apertured pressure plates, one thereof being movable, a shaft, operative connection between the shaft and the movable pressure plate whereby such plate is advanced upon the other pressure plate once during each revolution of the shaft, a rivet hopper, a rivet carrier receiving from the hopper and delivering to the aperture in one of the pressure plates, rivet-setting means operable through the aperture of the other pressure plate, and means driven by the shaft for controlling the delivery of rivets from the hopper.

7. In a broom making machine, in combination, an apertured pressure plate, a rivet hopper, a discharge chute therefor, and a tilting rivet carrier movable behind the pressure plate, such carrier being adapted to register alternately with the mouth of the chute and with the aperture of the plate.

8. In a broom making machine, in combination, a pair of coöperating oppositely-facing apertured pressure plates, rivet-delivering means operable through the aperture of one of the plates, rivet-setting means operable through the aperture of the other plate, a rivet hopper, a discharge chute for the hopper supplying the rivet-delivering means, a pair of oppositely-facing fingers oscillatable in a plane transverse to the length of the chute, said fingers being movable alternately into the path of rivets through the chute and being spaced apart longitudinally of the chute, and means for oscillating the fingers during each operation of the pressure plates.

9. In a broom making machine, in combination, a pair of coöperating oppositely-facing apertured pressure plates, one thereof being movable, a shaft, operative connection between the shaft and the movable pressure plate whereby such plate is advanced upon the other pressure plate once during each revolution of the shaft, a rivet hopper, a rivet carrier receiving from the hopper and delivering to the aperture in one of the pressure plates, rivet-setting means operable through the aperture of the other pressure plate, means driven by the shaft for controlling the delivery of rivets from the hopper, and means for arresting the movement of the shaft at each revolution thereof.

10. In a broom making machine, in combination, a pair of oppositely-facing coöperating forming dies, the face of each being adapted to receive one member of a pair of mating broom-head clamping plates having bowed shanks which form a tubular handle-receiving socket when fitted together, and an auger located at one side of the dies adapted to enter the space between them through the said socket.

11. In a broom-making machine, in combination, a pair of oppositely-facing coöperating pressure heads each having a die face adapted to receive one member of a pair of mating broom-head clamping plates having bowed shanks which form a tubular handle-receiving socket when fitted together, and an auger and handle-delivering mechanism located at one side of the pressure heads and operable in turn through the said tubular socket.

12. In a broom-making machine, in combination, a pair of oppositely-facing coöperating pressure heads each having a die face adapted to receive one member of a pair of mating broom-head clamping plates having bowed shanks which form a tubular handle-receiving socket when fitted together, and handle-delivering mechanism located at one side of the pressure heads delivering to the said socket.

13. In a broom-making machine, in combination, a pair of oppositely-facing coöperating pressure heads each having a die face adapted to receive one member of a pair of mating broom-head clamping plates having bowed shanks which form a tubular handle-receiving socket when fitted together, an oscillatable carriage located at one side of the pressure heads, and an auger and handle-delivering mechanism mounted therein and movable in turn by the oscillation of the carriage into register with the said tubular socket.

14. In a broom-making machine, in combination, a pair of coöperating oppositely-facing apertured pressure heads each having a die face adapted to receive one member of a pair of mating broom-head clamping plates having apertured bowed shanks adapted when fitted together to form a tubular handle-receiving socket, the apertures of the pressure heads being in alinement with the apertures of the shanks of the clamping plates, handle-delivering mechanism located at one side of the pressure heads delivering to the said tubular socket, and drilling means and rivet-delivering and setting means operable in turn through the apertures of the pressure heads.

15. In a broom-making machine, in combination, a pair of coöperating oppositely-facing pressure heads each having a die face adapted to receive one member of a pair of mating broom-head clamping plates having bowed shanks adapted when fitted together to form a tubular handle receiving socket, handle-delivering mechanism located at one side of the pressure-heads delivering to the said socket, and means for causing the relative approach of the pressure heads operable in part before the operation of the handle-delivering means and in part after the operation of the handle-delivering mechanism.

16. In a broom-making machine, in combination, a pair of oppositely-facing coöperating pressure head each having a die face adapted to receive one member of a pair of mating broom-head clamping plates and one of such plates having a lateral wing adapted to be folded upon the edge of the broom-head, and a laterally-movable die member engageable with the wing carried by one of the pressure heads.

17. In a broom-making machine, in combination, a pair of oppositely-facing coöperating pressure heads each having a die face adapted to receive one member of a pair of mating broom-head clamping plates and one of such plates having a lateral wing adapted to be folded upon the edge of the broom-head, a laterally-movable die member engageable with the wing pivotally mounted upon one of the pressure heads and having a cam-engaging heel, and a cam engageable with the said heel.

18. In a broom-making machine, in combination, a pair of oppositely-facing coöperating pressure heads each having a die face adapted to receive one member of a pair of mating broom-head clamping plates and having lateral wings adapted to be overlapped upon the edge of the broom-head, and laterally-movable die members engageable with the wings successively.

19. In a broom-making machine, in combination, a pair of oppositely-facing coöperating pressure heads each having a die face adapted to receive one member of a pair of mating broom-head clamping plates and having lateral wings adapted to be overlapped upon the edge of the broom-head, a pair of die members pivotally mounted for lateral movement engageable with the wings and each having a cam-engaging heel, and a cam engageable with the said heels in succession.

20. In a broom-making machine, in combination, a pair of oppositely-facing coöperating pressure heads each having a die face adapted to receive one member of a pair of mating broom-head clamping plates and having lateral wings adapted to be overlapped upon the edge of the broom-head, a pair of laterally movable die members engageable with the wings, one of said members having a slot, a pin mounted in the other laterally-movable die member projecting through said slot, a retracting spring bearing on the laterally-movable die member having the pin, and an advancing cam engageable with the laterally-movable die members in succession, the engagement between the advancing cam and the laterally-movable die member having the pin being in advance of the engagement between said cam and the slotted die member.

21. In a broom-making machine, in combination, a pair of oppositely-facing coöperating pressure heads each having a die face adapted to receive one member of a pair of mating broom-head clamping plates and having lateral wings adapted to be overlapped upon the edge of the broom-head, a pair of laterally-movable die members engageable with the wings, a retracing spring bearing on one of said members, connection between the laterally-movable die members adapted to permit them to be advanced independently but retracted simultaneously by the spring, and an advancing cam engageable with the laterally-movable die members in succession.

22. In a broom-making machine, in combination, a pair of oppositely-facing coöperating pressure heads each having a die face adapted to receive one member of a pair of mating broom-head clamping plates and having lateral wings adapted to be overlapped upon the edge of the broom-head, a pair of laterally-movable die members engageable with the wings coaxially pivoted upon one of the pressure heads, each of said members having a cam-engaging heel and one of said members having a slot, a pin mounted in the other laterally-movable die member projecting through the said slot, a retracting spring connected to the pin, and an advancing cam engageable with the said heels in succession, the engagement between the said cam and the heel of the member having the pin being in advance of the engagement between the said cam and the heel of the slotted member.

23. In a broom-making machine, in combination, a pair of coöperating oppositely-facing apertured pressure heads, a movable carriage in rear of one of the pressure heads, a drill spindle and a rivet-setting tool mounted in the carriage and adapted to be brought alternately into register with an aperture of the pressure head by the movement of the carriage, an operating bar reciprocable in a direction transverse to the direction of movement of the carriage, cross-heads mounted on the drill spindle and on the rivet-setting tool, respectively, adapted to be brought into engagement with the operating bar alternately by the movement of the carriage, mechanism actuated by the operating bar for shifting the carriage, and means for reciprocating the operating bar twice during each cycle of movement of the pressure heads.

24. In a broom-making machine, in combination, a pair of broom-head forming dies, the face of one of the dies being provided with a groove extending to the edge of the die, and an auger located at one side of the dies adapted to enter the space between them through the said groove.

25. In a broom-making machine, in combination, a pair of broom-head forming dies, the face of one of the dies being provided with a groove extending to the edge of the die, and handle-delivering mechanism located at one side of the dies delivering through the said groove.

26. In a broom-making machine, in combination, a handle hopper, a pair of oppositely-facing channeled members leading laterally from the bottom of the hopper, the upper side wall of each of such members being notched adjacent its outer end, and handle-conveying means including a vertically-movable member located between the said channeled members in line with the said notches.

HUGH M. MARSH.

Witnesses:
  EDW. C. PARROTT,
  FRANK CHAMBERS.